US012347984B2

(12) United States Patent
Sugiura

(10) Patent No.: US 12,347,984 B2
(45) Date of Patent: Jul. 1, 2025

(54) ELECTRICAL CONNECTOR

(71) Applicant: I-PEX Inc., Kyoto (JP)

(72) Inventor: Ichiro Sugiura, Machida (JP)

( * ) Notice: Subject to any disclaimer, the term of this patent is extended or adjusted under 35 U.S.C. 154(b) by 425 days.

(21) Appl. No.: 18/051,059

(22) Filed: Oct. 31, 2022

(65) Prior Publication Data

US 2023/0068741 A1 Mar. 2, 2023

Related U.S. Application Data

(63) Continuation of application No. PCT/JP2021/017261, filed on Apr. 30, 2021.

(30) Foreign Application Priority Data

May 7, 2020 (JP) ................................ 2020-082011

(51) Int. Cl.

| | |
|---|---|
| ***H01R 24/40*** | (2011.01) |
| ***H01R 4/28*** | (2006.01) |
| ***H01R 12/71*** | (2011.01) |
| ***H01R 13/6471*** | (2011.01) |
| ***H01R 103/00*** | (2006.01) |

(52) U.S. Cl.

CPC ............... *H01R 24/40* (2013.01); *H01R 4/28* (2013.01); *H01R 12/71* (2013.01); *H01R 13/6471* (2013.01); *H01R 2103/00* (2013.01)

(58) Field of Classification Search

CPC .......... H01R 24/40; H01R 4/28; H01R 12/71; H01R 13/6471; H01R 2103/00

USPC .................................................. 439/578, 582

See application file for complete search history.

(56) References Cited

U.S. PATENT DOCUMENTS

| | | | | |
|---|---|---|---|---|
| 6,971,913 B1 * | 12/2005 | Chu | .................... | H01R 13/567 439/585 |
| 10,707,603 B2 * | 7/2020 | Yufu | .................... | H01R 13/405 |
| 10,741,973 B2 * | 8/2020 | Yufu | .................... | H01R 12/79 |

(Continued)

FOREIGN PATENT DOCUMENTS

| | | |
|---|---|---|
| CN | 107919555 | 4/2018 |
| JP | 2016-100190 | 5/2016 |

(Continued)

OTHER PUBLICATIONS

International Search Report dated Jul. 6, 2021 for PCT/JP2021/017261.

(Continued)

*Primary Examiner* — Gary F Paumen

(74) *Attorney, Agent, or Firm* — SOEI PATENT & LAW FIRM

(57) ABSTRACT

A coaxial connector device includes: a signal contact member; a signal contact member; a ground contact member to which a ground potential is applied; and a conductive member including a rear ground connection portion that is connected to the ground contact member, and a front ground connection portion that is connected to a ground contact portion of a mating connector device. When viewed in a direction of fitting to the mating connector device, the front ground connection portion overlaps at least a part of a signal line including a center conductor of a coaxial cable and the signal contact member, and at least a part of a signal line including a center conductor of a coaxial cable and the signal contact member.

17 Claims, 20 Drawing Sheets

(56) References Cited

U.S. PATENT DOCUMENTS

| | | | | |
|---|---|---|---|---|
| 2007/0184710 | A1 | 8/2007 | Nagata et al. | |
| 2012/0295477 | A1* | 11/2012 | Funahashi ............ | H01R 24/545<br>439/578 |
| 2012/0322304 | A1* | 12/2012 | Taguchi ............... | H01R 13/501<br>439/582 |
| 2013/0149897 | A1* | 6/2013 | Takano ................ | H01R 12/718<br>439/582 |
| 2015/0357729 | A1 | 12/2015 | Uratani et al. | |
| 2018/0102616 | A1 | 4/2018 | Hashimoto et al. | |
| 2019/0190169 | A1* | 6/2019 | Nishiyama ............ | H01R 24/40 |
| 2019/0348784 | A1 | 11/2019 | Yufu et al. | |
| 2019/0348800 | A1 | 11/2019 | Yufu et al. | |
| 2021/0242631 | A1 | 8/2021 | Nakagawa | |
| 2023/0068741 | A1 | 3/2023 | Sugiura | |

FOREIGN PATENT DOCUMENTS

| | | |
|---|---|---|
| JP | 2018-006110 | 1/2018 |
| JP | 6269558 | 1/2018 |
| JP | 2018-190630 | 11/2018 |
| JP | 2019-197684 | 11/2019 |
| JP | 2019-197685 | 11/2019 |
| JP | 2020-068163 | 4/2020 |
| WO | 2021/225122 | 11/2021 |

OTHER PUBLICATIONS

International Preliminary Report on Patentability with Written Opinion dated Nov. 17, 2022 for PCT/JP2021/017261.

* cited by examiner

ELECTRICAL CONNECTOR

CROSS-REFERENCE TO RELATED APPLICATIONS

This application is a continuation application of PCT Application No. PCT/JP2021/017261, filed on Apr. 30, 2021, which claims the benefit of priority from Japanese Patent Application No. 2020-082011, filed on May 7, 2020. The entire contents of the above listed PCT and priority applications are incorporated herein by reference.

BACKGROUND

The present disclosure relates to an electrical connector.

A connector device has been known in which a plug connector attached to a terminal portion of a coaxial cable is fitted to a receptacle connector mounted on a wiring board to electrically connect the coaxial cable and an electrical circuit of the wiring board (refer to, for example, Patent Literature 1: Japanese Patent No. 6269558).

Here, in the connector device as described above, when signals inside the connectors propagate to surroundings of the connector device, the signals affect surrounding external products, which is a concern. For this reason, in the connector device as described above, it is important to prevent signals inside the connectors from propagating to the surroundings (to improve noise resistance).

The present disclosure is conceived in view of the above circumstances, and an object of the present disclosure is to provide an electrical connector capable of improving noise resistance.

SUMMARY

An electrical connector according to one aspect of the present disclosure includes: a first signal contact member that is connected to a center conductor of a first coaxial cable, and that is connected to a first signal contact portion of a mating connector mounted on a circuit board; a second signal contact member that is connected to a center conductor of a second coaxial cable, and that is connected to a second signal contact portion of the mating connector; a ground contact member which includes an annular fitting portion that is fitted and connected to a ground contact portion of the mating connector, and a shell portion that bendably extends from the annular fitting portion to be connected to outer conductors of the first coaxial cable and of the second coaxial cable, and to which a ground potential is applied; and a conductive member including a first ground connection portion that is connected to the ground contact member, and a second ground connection portion that is connected to the ground contact portion of the mating connector. When viewed in a direction of fitting to the mating connector, the second ground connection portion of the conductive member overlaps at least a part of a first signal line including the center conductor of the first coaxial cable and the first signal contact member, and at least a part of a second signal line including the center conductor of the second coaxial cable and the second signal contact member.

The electrical connector according to one aspect of the present disclosure includes the first signal contact member connected to the center conductor of the first coaxial cable; the second signal contact member connected to the center conductor of the second coaxial cable; the ground contact member to which a ground potential is applied; and the conductive member. The first ground connection portion of the conductive member is connected to the ground contact member, and the second ground connection portion is connected to the ground contact portion of the mating connector. Furthermore, in the electrical connector, when viewed in the direction of fitting, the second ground connection portion overlaps at least a part of the first signal line including the center conductor of the first coaxial cable and the first signal contact member, and at least a part of the second signal line including the center conductor of the second coaxial cable and the second signal contact member. Since the second ground connection portion overlaps at least a part of the first and second signal lines, signals of the first and second signal lines are prevented from propagating to the outside (surroundings of a connector device including the electrical connector and the mating connector). As a result, signals of the first and second signal lines can be prevented from becoming noise and affecting surrounding external products, EMI characteristics of the electrical connector can be improved, and noise resistance can be improved.

The shell portion of the ground contact member may include barrel portions that clamp and hold the first coaxial cable and the second coaxial cable, respectively, and the conductive member may be connected to the barrel portions. In such a manner, since the barrel portions that hold the coaxial cables forming the signal lines and the conductive member are connected to (in contact with) each other, contact locations can be reliably set to a ground potential, and portions at which the signal lines and the conductive member (specifically, the second ground connection portion) overlap each other can be suitably formed.

The ground contact portion of the mating connector may include a first portion that is fitted and connected to the annular fitting portion of the ground contact member. The second ground connection portion may include a pair of first connection portions that are connected to the first portion. One of the pair of first connection portions may overlap at least a part of the first signal line when viewed in the direction of fitting, and the other of the pair of first connection portions may overlap at least a part of the second signal line when viewed in the direction of fitting. In such a manner, since the pair of first connection portions of the second ground connection portion are connected to a portion related to fitting (first portion) in the ground contact portion of the mating connector, in a state where the pair of first connection portions are fitted to the mating connector, a contact location can be reliably set to a ground potential. Furthermore, since one of the pair of first connection portions overlaps at least a part of the first signal line, and the other of the pair of first connection portions overlaps at least a part of the second signal line, signals of the first and second signal lines can be reliably prevented from propagating to the outside (surroundings of the connector device including the electrical connector and the mating connector).

The shell portion of the ground contact member may include barrel portions that clamp and hold the first coaxial cable and the second coaxial cable, respectively. When viewed in the direction of fitting, the pair of first connection portions may overlap the barrel portions in an arrangement direction of the first signal contact member and the second signal contact member. In such a manner, since the pair of first connection portions and the barrel portions that hold the coaxial cables overlap each other, portions at which the pair of first connection portions and the signal lines (specifically, the center conductors of the coaxial cables) overlap each other can be suitably formed. As a result, signals of the first and second signal lines can be appropriately prevented from propagating to the outside (surroundings of the connector device including the electrical connector and the mating connector).

An opening portion may be formed in the annular fitting portion of the ground contact member, and the pair of first connection portions may be disposed in the opening portion. In such a manner, for example, since the pair of first connection portions forming the conductive member are provided in the opening portion that is formed in a process of manufacturing, the opening portion is partially closed by the pair of first connection portions, so that signals (high-frequency signals) of the signal lines can be effectively prevented from leaking from the opening portion to the outside.

The ground contact portion of the mating connector may include a second portion disposed between the first signal contact portion and the second signal contact portion, and the second ground connection portion may include a second connection portion that is connected to the second portion. Since the second connection portion is connected to the second portion of the ground contact portion of the mating connector disposed between the first signal contact portion and the second signal contact portion, signals are prevented from propagating between the signal contacts that are different from each other. As a result, an isolation characteristic can be improved, and noise resistance can be improved.

The shell portion of the ground contact member may include barrel portions that hold the first coaxial cable and the second coaxial cable, respectively, and the conductive member may be connected to the barrel portions. In such a manner, since the barrel portions that hold the coaxial cables forming the signal lines and the conductive member are connected to (in contact with) each other, contact locations can be reliably set to a ground potential, and portions at which the signal lines and the conductive member (specifically, the second ground connection portion) overlap each other can be suitably formed.

The ground contact portion of the mating connector may include a first portion that is fitted and connected to the annular fitting portion of the ground contact member. The second ground connection portion may include a first connection portion that is connected to the first portion. The first connection portion may be continuously formed in an arrangement direction of the first signal contact member and the second signal contact member, and overlap at least a part of the first signal line and at least a part of the second signal line when viewed in the direction of fitting. In such a manner, since the first connection portion of the second ground connection portion is connected to a portion related to fitting (first portion) in the ground contact portion of the mating connector, in a state where the first connection portion is fitted to the mating connector, a contact location can be reliably set to a ground potential. Furthermore, since the first connection portion that is continuously formed without a cutout, a gap, or the like formed overlaps at least a part of the first signal line and at least a part of the second signal line, signals of the first and second signal lines can be more appropriately prevented from propagating to the outside (surroundings of the connector device including the electrical connector and the mating connector).

An opening portion may be formed in the annular fitting portion of the ground contact member, and the first connection portion may be disposed in the opening portion. In such a manner, for example, since the first connection portion forming the conductive member is provided in the opening portion that is formed in a process of manufacturing, the opening portion is effectively closed by the first connection portion, so that signals (high-frequency signals) of the signal lines can be effectively prevented from leaking from the opening portion to the outside.

The second connection portion may be disposed between the first signal contact member and the second signal contact member to block at least a part of a region between the first signal contact member and the second signal contact member. In such a manner, since the second connection portion is disposed between the signal contact members to block at least a part of the region between the signal contact members, signals can be more effectively prevented from propagating between the signal contact members. Accordingly, the isolation characteristic can be further improved.

The second connection portion may extend along an extending direction of the first signal contact member and of the second signal contact member. In such a manner, since the second connection portion extends along the extending direction of the first signal contact member and of the second signal contact member, the region between the signal contact members is effectively blocked by the second connection portion, so that the above-described isolation characteristic can be further improved.

The second connection portion may be disposed between the first signal contact member and the second signal contact member to block an entirety of the region between the first signal contact member and the second signal contact member. In such a manner, since the region between the signal contact members is completely blocked by the second connection portion, the above-described isolation characteristic can be further improved.

An area of the second connection portion when viewed in an arrangement direction of the first signal contact member and the second signal contact member may be larger than an area of each of the first signal contact member and the second signal contact member when viewed in the arrangement direction. In such a manner, since the area of the second connection portion between the signal contact members is set to be large, signals are more effectively prevented from propagating between the signal contact members by the second connection portion. Accordingly, the isolation characteristic can be further improved.

The second connection portion may be formed of a member separate from other regions in the second ground connection portion. Accordingly, the degree of freedom in the shape, the raw material, and the disposition of the second connection portion is increased, and signals are more effectively prevented from propagating between the signal contact members by the second connection portion of which the shape, the raw material, and the disposition are appropriately set. Accordingly, the isolation characteristic can be further improved.

The second connection portion may be connected to a ground bar electrically connected to the outer conductors of the first coaxial cable and of the second coaxial cable. Accordingly, similarly to the center conductor of the first coaxial cable and the center conductor of the second coaxial cable adjacent to each other with the outer conductors sandwiched therebetween, the first signal contact member and the second signal contact member are adjacent to each other with the second connection portion sandwiched therebetween, the second connection portion being electrically connected to the outer conductors through the ground bar, so that similarly to the coaxial cables adjacent to each other, signals can be effectively prevented from propagating between the signal contact members.

DETAILED DESCRIPTION

Figure 1:
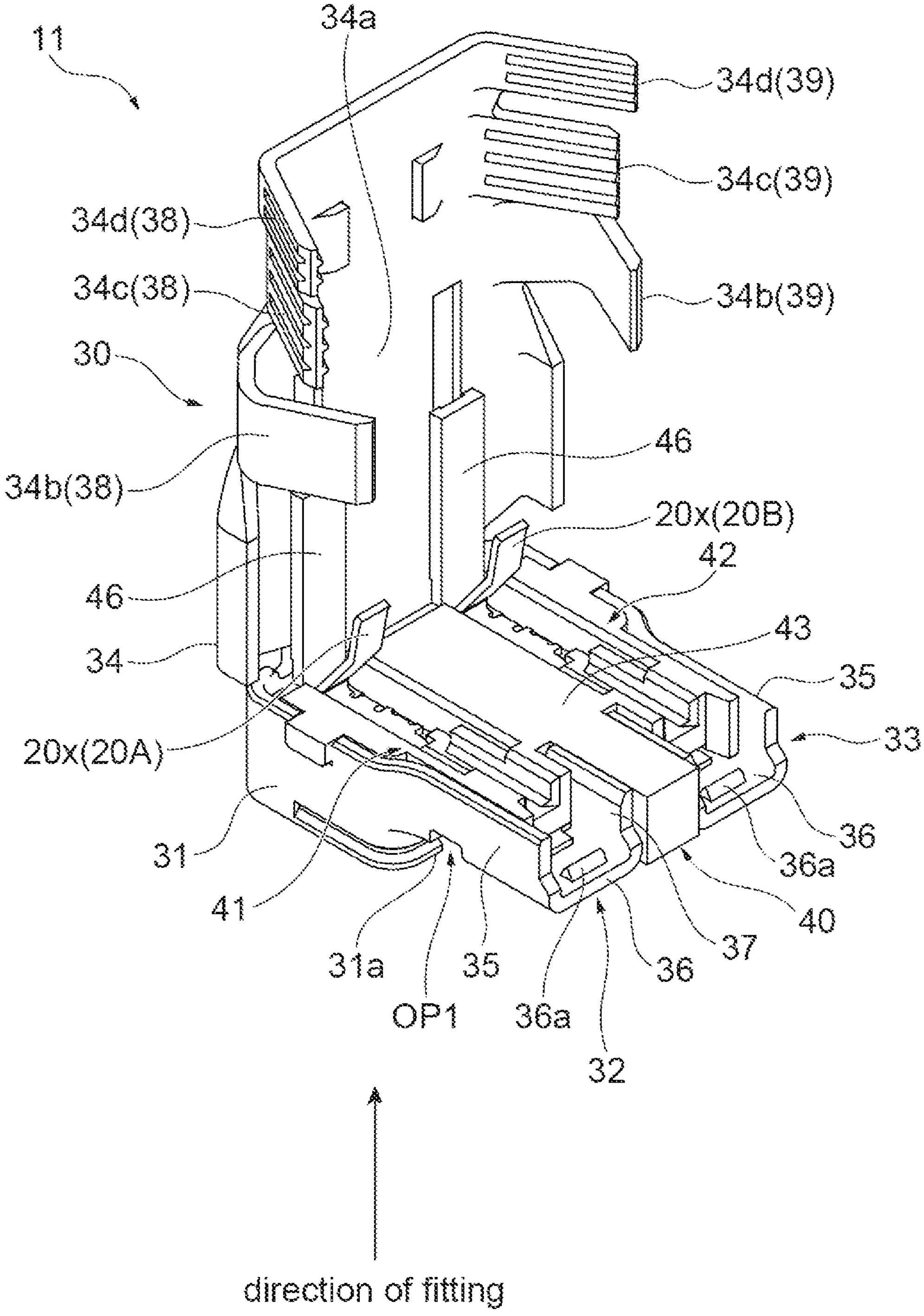
FIG. 1 is a perspective view showing a coaxial connector device according to the present example.

FIG. 1 is a perspective view showing a coaxial connector device 11 (electrical connector) according to the present example. The coaxial connector device 11 shown in FIG. 1 is used by being attached to one end portions of two coaxial cables. The coaxial cables in which the coaxial connector device 11 is attached to the one end portions are shown as coaxial cables 12A and 12B in FIG. 4 to be described later. Each of the coaxial cables 12A and 12B includes a center conductor 13; an inner insulator 14 that tightly surrounds the center conductor 13; an outer conductor 15 that tightly surrounds the inner insulator 14; and a skin insulator 16 that tightly surrounds the outer conductor 15. At each of the one end portions of the coaxial cables 12A and 12B to which the coaxial connector device 11 is attached, the skin insulator 16 is partially cut away to expose the outer conductor 15, and each of the outer conductor 15 and the inner insulator 14 is partially cut away to expose the center conductor 13.

Figure 2:
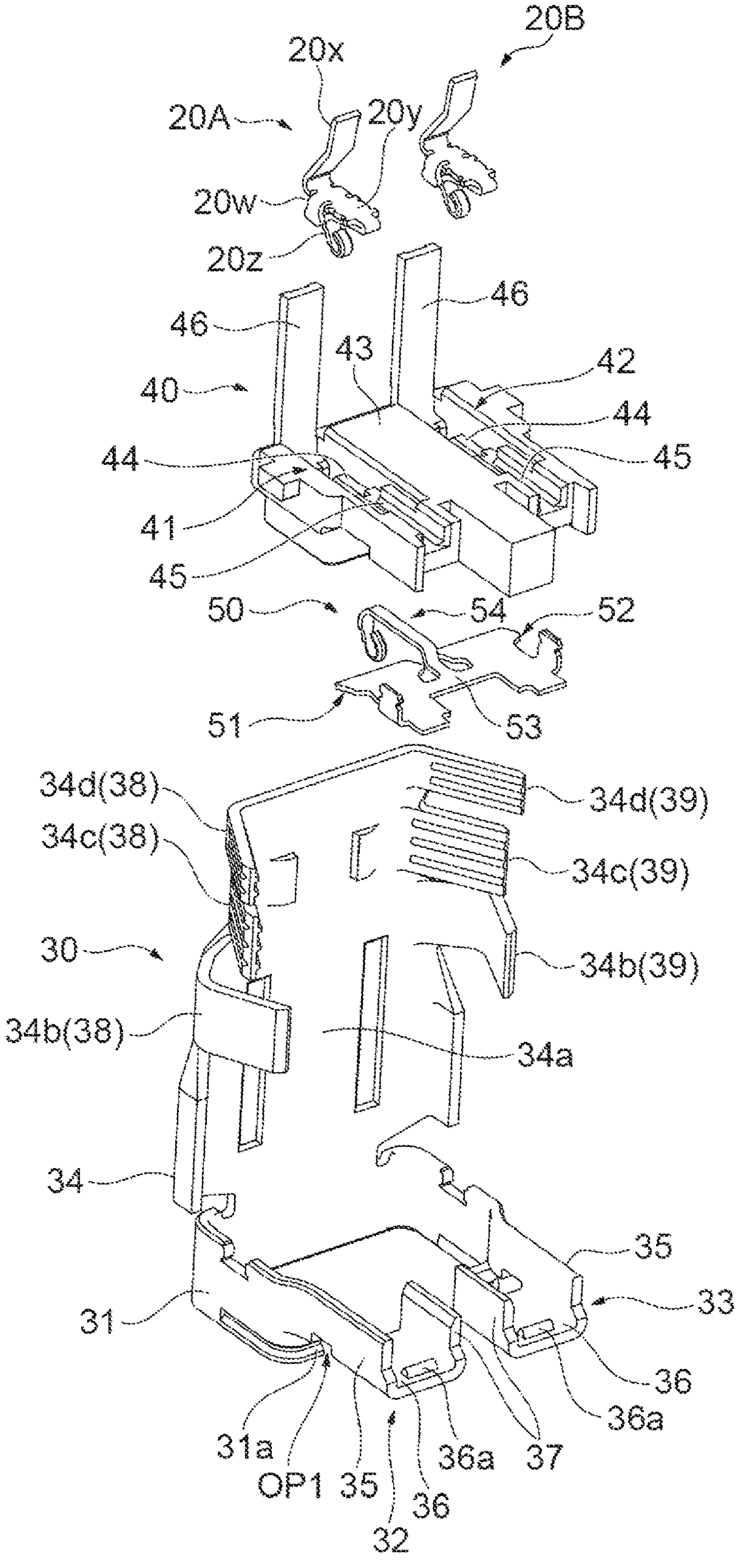
FIG. 2 is an exploded perspective view showing the coaxial connector device according to the present example.

FIG. 2 is an exploded perspective view showing the coaxial connector device 11 according to the present example. As shown in FIGS. 1 and 2, the coaxial connector device 11 includes, as main components, two signal contact members 20A and 20B (a first signal contact member and a second signal contact member), a ground contact member 30, and a conductive member 50 (refer to FIG. 2). In addition, the coaxial connector device 11 may include an insulating housing member 40.

The insulating housing member 40 is made of an insulating material such as a synthetic resin material. The insulating housing member 40 supports the signal contact members 20A and 20B and the ground contact member 30 in a mutually insulated state. The insulating housing member 40 includes a first supporting portion 41 related to supporting the signal contact member 20A, a second supporting portion 42 related to supporting the signal contact member 20B, and a base portion 43 provided between the first supporting portion 41 and the second supporting portion 42 (therebetween in a width direction of the coaxial connector device 11).

The first supporting portion 41 includes a tubular portion 44 (refer to FIG. 2), a center conductor supporting portion 45 (refer to FIG. 2), and a flat plate portion 46. The tubular portion 44 holds the signal contact member 20A. The center conductor supporting portion 45 extends from the tubular portion 44, and supports the center conductor 13 of the coaxial cable 12A to be connected to the signal contact member 20A. The flat plate portion 46 extends along an inner surface of a base plate 34*a* (to be described later) of a shell portion 34 of the ground contact member 30. The flat plate portion 46 comes into contact with a first portion 20*x* (to be described later) of the signal contact member 20A to press a first portion 20*x* and to bend the first portion 20*x* in a state where the shell portion 34 has assumed a bent position (state of FIGS. 5 and 6). A configuration of the second supporting portion 42 is same as the configuration of the first supporting portion 41 (the signal contact member 20A and the coaxial cable 12A are replaced with the signal contact member 20B and the coaxial cable 12B, and the same in that the tubular portion 44, the center conductor supporting portion 45, and the flat plate portion 46 are provided).

The ground contact member 30 is made of an elastic conductive material. A ground potential is applied to the ground contact member 30, and the ground contact member 30 is electrically connected to the outer conductors 15 of the coaxial cables 12A and 12B. The ground contact member 30 includes an annular fitting portion 31; a first cable supporting portion 32 related to supporting the coaxial cable 12A; a second cable supporting portion 33 related to supporting the coaxial cable 12B; and the shell portion 34.

Figure 6:
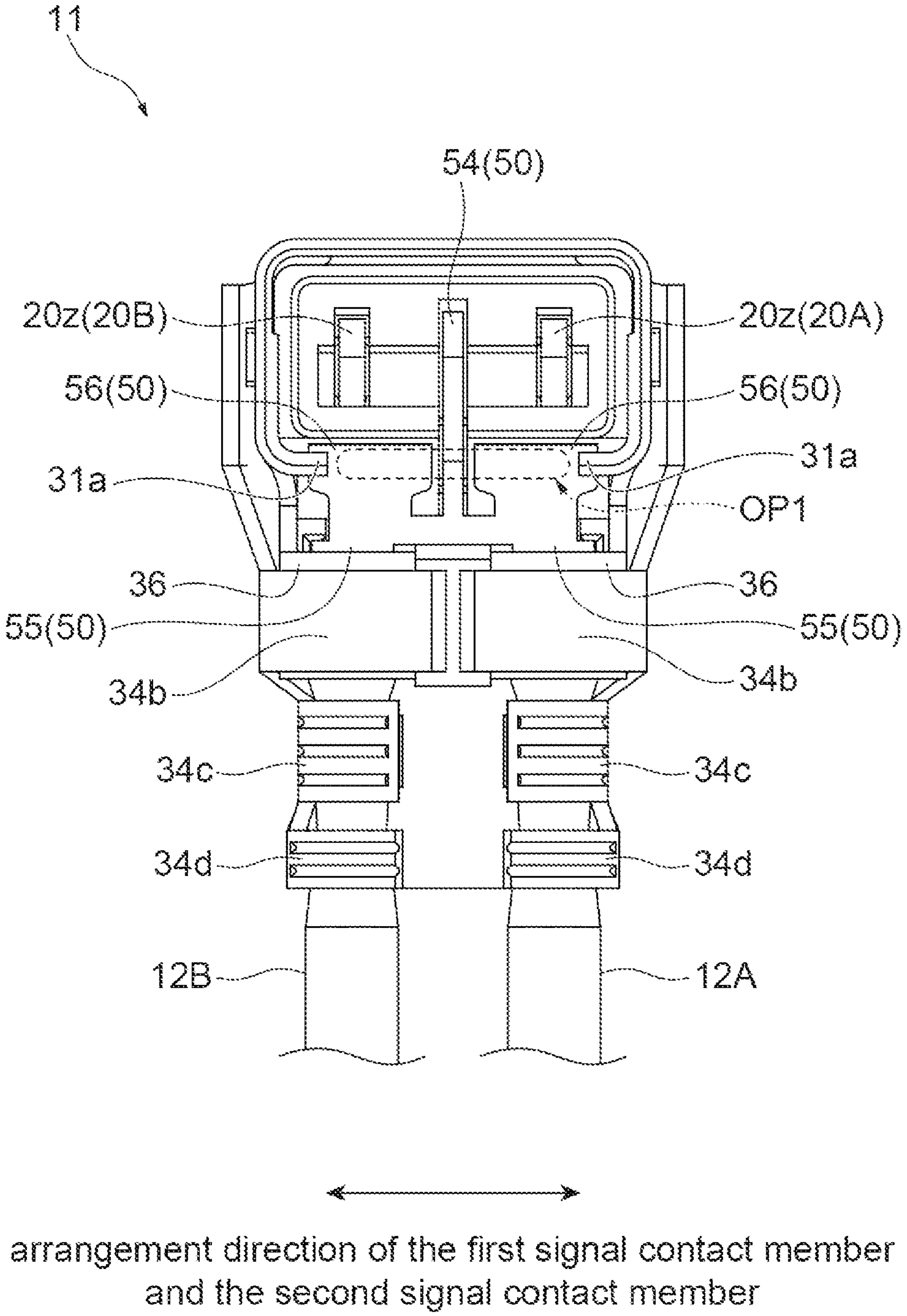
FIG. 6 is a bottom view showing a state where the coaxial connector device according to the present example is attached to the one end portions of the coaxial cables.
Figure 7:
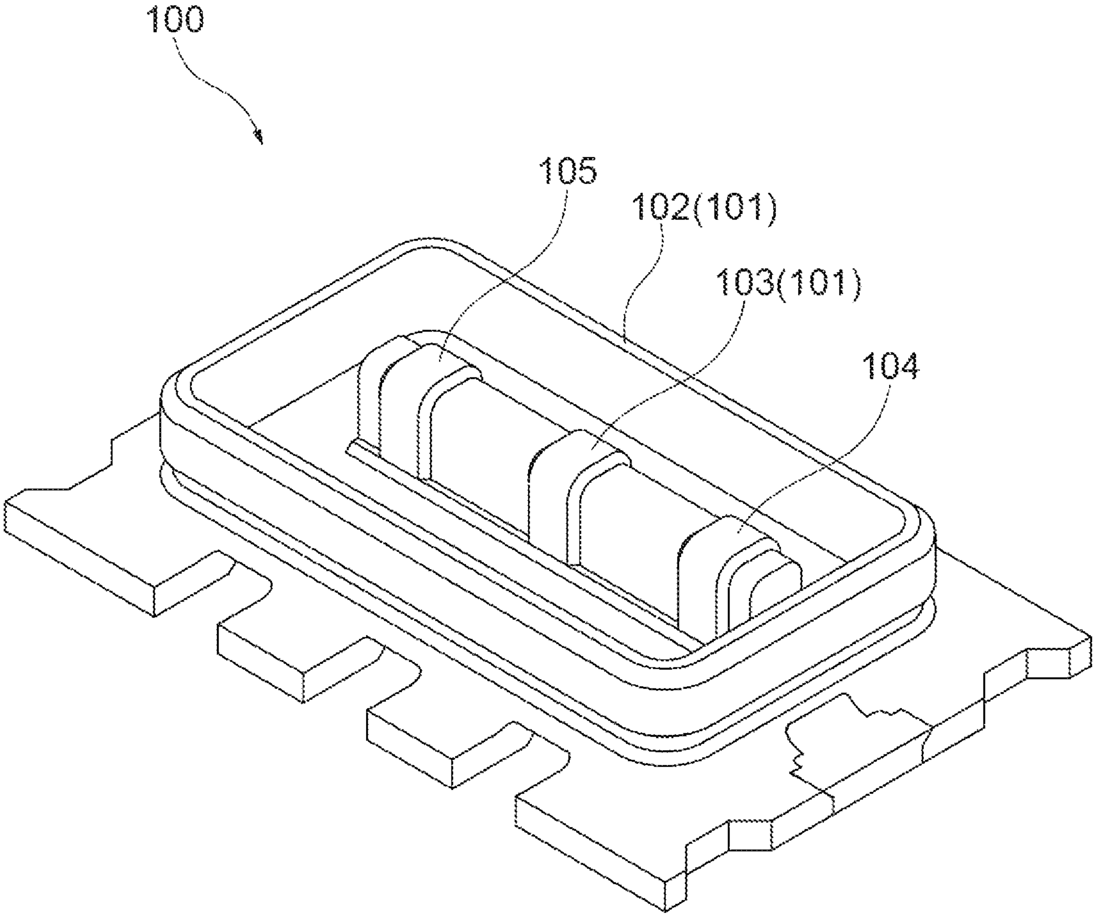
FIG. 7 is a perspective view showing a mating connector device to which the coaxial connector device according to the present example is coupled.

The annular fitting portion 31 is a portion that partially surrounds a part of the insulating housing member 40 (specifically, a portion including the tubular portions 44 of the first supporting portion 41 and of the second supporting portion 42), and that is fitted and connected to an annular fitting portion 102 of a ground contact portion 101 of a mating connector device 100 (refer to FIG. 7). An opening portion OP1 (refer to FIG. 6) interposed between a pair of facing end portions 31*a* and 31*a* of the annular fitting portion 31 is formed in the annular fitting portion 31.

The first cable supporting portion 32 includes an arm portion 35, a placement portion 36, and a wall portion 37. The arm portion 35 extends from one end portion 31*a* of the pair of end portions 31*a* of the annular fitting portion 31 along the center conductor supporting portion 45 of the insulating housing member 40. The placement portion 36 is continuous with a lower end of the arm portion 35, and extends in a horizontal direction (specifically, the width direction of the coaxial connector device 11) such that the center conductor supporting portion 45 and the coaxial cable 12A are placed thereon. The wall portion 37 is provided to be continuous with the placement portion 36 and to face the arm portion 35. A protrusion 36*a* is provided on a placement surface of the placement portion 36 for the coaxial cable 12A. The protrusion 36*a* is a projection-shaped portion that comes into contact with the outer conductor 15 of the coaxial cable 12A (refer to FIG. 10). The coaxial cable 12A is positioned by being fixed (supported) in a region defined by the arm portion 35, the placement portion 36, and the wall portion 37. A configuration of the second cable supporting portion 33 is the same as the configuration of the first cable supporting portion 32 (the one end portion 31*a* and the coaxial cable 12A are replaced with the other end portion 31*a* and the coaxial cable 12B, and the same in that the arm portion 35, the placement portion 36, the protrusion 36*a*, and the wall portion 37 are provided).

The shell portion 34 is a portion that bendably extends from one end of the annular fitting portion 31, and that is connected to the outer conductors 15 of the coaxial cables 12A and 12B when the shell portion 34 is folded. The shell portion 34 selectively assumes an upright position where the shell portion 34 is not folded with respect to the annular fitting portion 31 and the bent position where the shell portion 34 is folded with respect to the annular fitting portion 31. The shell portion 34 assumes the upright position in FIGS. 1, 2, and 4, and assumes the bent position in FIGS. 5 and 6 to be described later. For the description of the shell portion 34, FIGS. 5 and 6 will also be referred to in addition to FIGS. 1 and 2.

Figure 5:
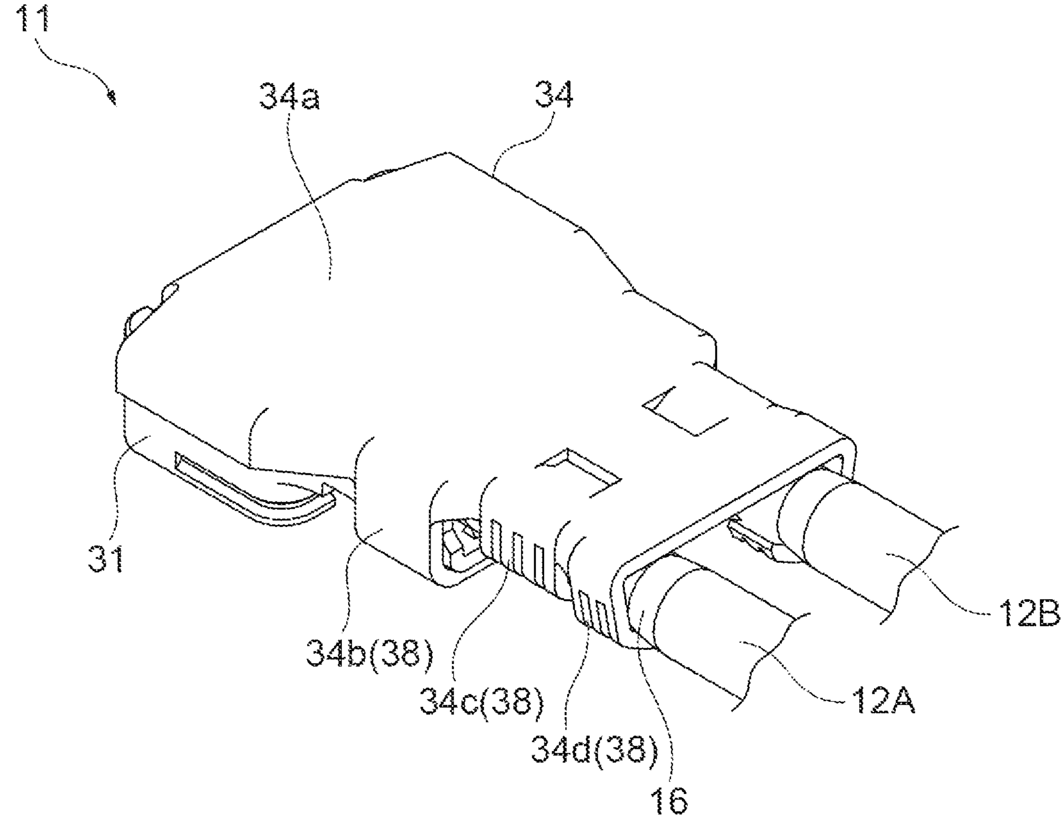
FIG. 5 is a perspective view from above showing a state where the coaxial connector device according to the present example is attached to the one end portions of the coaxial cables.

The shell portion 34 includes the base plate 34*a* covering an upper surface of the annular fitting portion 31; a first fixing portion 38 related to fixing the coaxial cable 12A; and a second fixing portion 39 related to fixing the coaxial cable 12B. As shown in FIG. 5, the base plate 34*a* extends from a location of connection to the annular fitting portion 31 to a region bordering outer surfaces of the coaxial cables 12A and 12B. The first fixing portion 38 includes clamping portions 34*b*, 34*c*, and 34*d* that are portions standing with respect to the base plate 34*a* in the bent position (refer to FIGS. 5 and 6). The clamping portions 34*b*, 34*c*, and 34*d* are foldably configured, and are barrel portions that clamp and hold the coaxial cable 12A.

The clamping portion 34*b* is folded to cover the placement portion 36, thereby sandwiching the placement portion 36, the conductive member 50, the center conductor supporting portion 45, and the coaxial cable 12A between the clamping portion 34*b* and the base plate 34*a* to fix positions relative to each other. Specifically, the clamping portion 34*b* fixes the coaxial cable 12A to the placement portion 36 such that the protrusion 36*a* of the placement portion 36 comes into contact with the outer conductor 15 of the coaxial cable 12A. Accordingly, the ground contact member 30 and the outer conductor 15 can be reliably brought into contact with and electrically connected to each other. The clamping portion 34*c* is folded to cover the coaxial cable 12A with the outer conductor 15 exposed, on a side closer to a rear end of the coaxial cable 12A than the clamping portion 34*b*, thereby sandwiching the coaxial cable 12A between the clamping portion 34*c* and the base plate 34*a* to fix the position of the coaxial cable 12A. The clamping portion 34*d* is folded to cover the skin insulator 16, on a side closer to the rear end of the coaxial cable 12A than the clamping portion 34*c*, thereby sandwiching the coaxial cable 12A between the clamping portion 34*d* and the base plate 34*a* to fix the position of the coaxial cable 12A. The coaxial cable 12A with the outer conductor 15 exposed is clamped by the clamping portion 34*c*, so that the ground contact member 30 and the outer conductor 15 can be reliably brought into contact with and electrically connected to each other. A configuration of the second fixing portion 39 is the same as the configuration of the first fixing portion 38 (the coaxial cable 12A is replaced with the coaxial cable 12B, and the same in that the clamping portions 34*b*, 34*c*, and 34*d* are provided).

The signal contact members 20A and 20B are made of an elastic conductive material. The signal contact member 20A is connected to the center conductor 13 of the coaxial cable 12A, and is connected to a signal contact portion 104 (refer to FIG. 7) of the mating connector device 100 (mating connector) mounted on a circuit board (not shown). The signal contact member 20B is connected to the center conductor 13 of the coaxial cable 12B, and is connected to a signal contact portion 105 (refer to FIG. 7) of the mating connector device 100 (mating connector) mounted on the circuit board (not shown).

Figure 10:
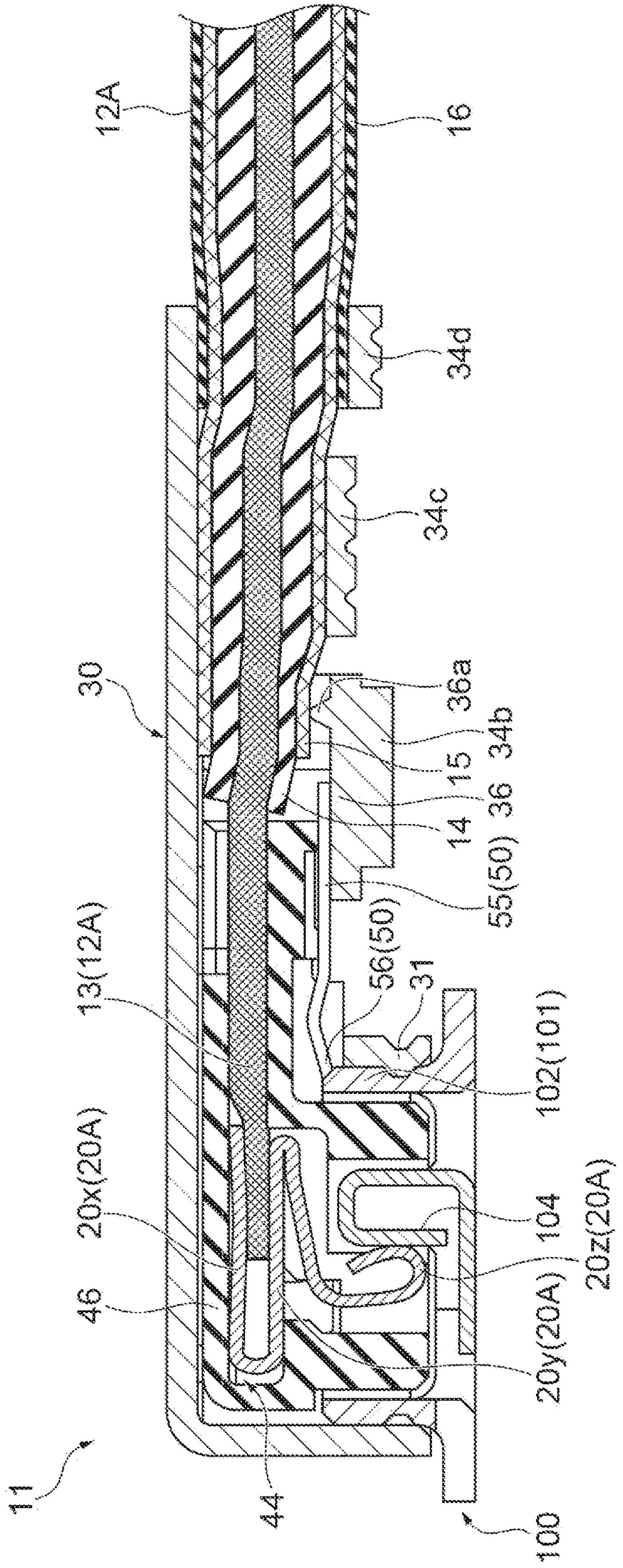
FIG. 10 is a cross-sectional view showing a cross section taken along line X-X in FIG. 8.

As shown in FIGS. 2 and 10 and the like, the signal contact member 20A includes the first portion 20*x*, a second portion 20*y*, a third portion 20*z*, and locking portions 20*w*. The signal contact member 20A is disposed in the tubular portion 44 (refer to FIG. 10). The second portion 20*y* is a portion extending in an extending direction of the coaxial cable 12A, and is a portion that comes into contact with the center conductor 13 of the coaxial cable 12A through an upper surface of the second portion 20*y*. The first portion 20*x* is a portion that bendably extends from a tip (end portion on a side away from the coaxial cable 12A) of the second portion 20*y*. In a state where the shell portion 34 assumes the bent position (state of FIG. 10), the first portion 20*x* is pressed by the flat plate portion 46, and is bent to sandwich the center conductor 13 between the first portion 20*x* and the second portion 20*y*. The third portion 20*z* is a portion formed in a U shape that extends downward in a tip direction of the second portion 20*y* so as to be folded from a rear end (end portion opposite a side that is continuous with the first portion 20*x*) of the second portion 20*y*, and that extends downward, is folded at a lower end, and extends upward. The third portion 20*z* is connected to the signal contact portion 104 of the mating connector device 100 at a portion formed in a U shape (refer to FIG. 10). The locking portions 20*w* are portions that are fixed to the insulating housing member 40 by engaging locking portions (not shown) of the insulating housing member 40. The locking portions 20*w* extend downward from both side surfaces of the second portion 20*y*. A configuration of the signal contact member 20B is same as the configuration of the signal contact member 20A (the coaxial cable 12A is replaced with the coaxial cable 12B, and the same in that the first portion 20*x*, the second portion 20*y*, the third portion 20*z*, and the locking portions 20*w* are provided).

Figure 3:
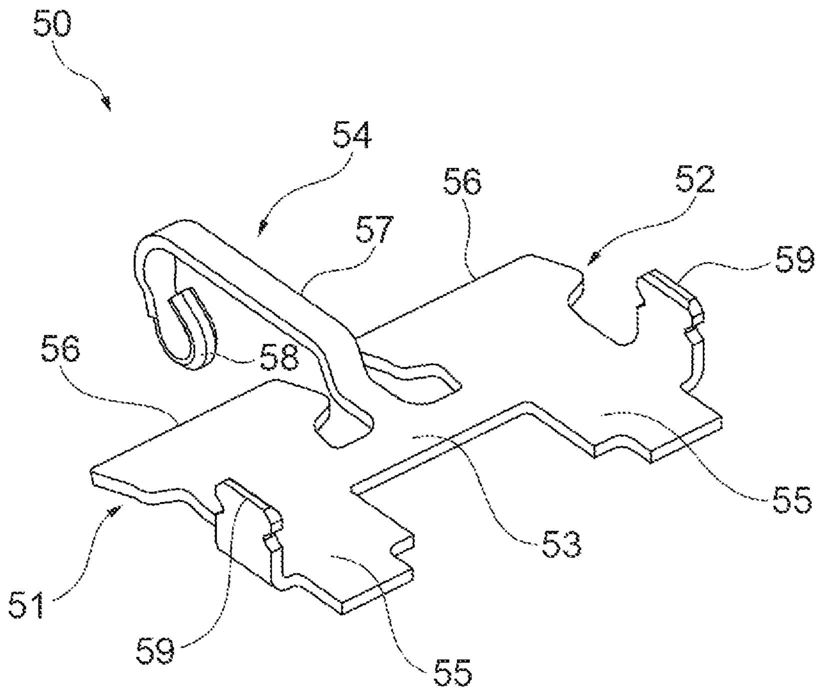
FIG. 3 is a perspective view of a conductive member of the coaxial connector device according to the present example when viewed from above.

FIG. 3 is a perspective view of the conductive member 50 of the coaxial connector device 11 according to the present example when viewed from above. As shown in FIG. 3, the conductive member 50 includes a first region 51, a second region 52, an intermediate region 53, an isolation characteristic improving portion 54 (a second ground connection portion and a second connection portion), and connection portions 59.

The first region 51 includes a rear ground connection portion 55 (first ground connection portion) and a front ground connection portion 56 (the second ground connection portion and a first connection portion) that is continuous with the rear ground connection portion 55. The rear ground connection portion 55 is a flat plate-shaped portion that is connected to (comes into contact with) the ground contact member 30, specifically, the placement portion 36 of the first cable supporting portion 32 (refer to FIG. 10).

The front ground connection portion 56 is a flat plate-shaped portion that is connected to (comes into contact with) the annular fitting portion 102 of the ground contact portion 101 of the mating connector device 100 (refer to FIG. 10). When viewed in a direction of fitting to the mating connector device 100, as shown in FIGS. 6 and 10, the front ground connection portion 56 overlaps at least a part of a signal line including the center conductor 13 of the coaxial cable 12A and the signal contact member 20A (specifically, a part of the center conductor 13). When viewed in the direction of fitting described above, as shown in FIG. 6, the front ground connection portion 56 overlaps the clamping portion 34*b* that is a barrel portion, in an arrangement direction of the signal contact members 20A and 20B (in the width direction of the coaxial connector device 11). In addition, as shown in FIG. 6, the front ground connection portion 56 is disposed in the opening portion OP1 interposed between the end portions 31*a* and 31*a* of the annular fitting portion 31.

A configuration of the second region 52 is the same as the configuration of the first region 51 (the coaxial cable 12A is replaced with the coaxial cable 12B, and the same in that the rear ground connection portion 55 and the front ground connection portion 56 are provided). Namely, the conductive member 50 includes a pair of the front ground connection portions 56 and 56 to be connected to the annular fitting portion 102 of the mating connector device 100, one front ground connection portion 56 (the front ground connection portion 56 of the first region 51) overlaps a part of the center conductor 13 of the coaxial cable 12A when viewed in the direction of fitting, and the other front ground connection portion 56 (the front ground connection portion 56 of the second region 52) overlaps a part of the center conductor 13 of the coaxial cable 12B when viewed in the direction of fitting.

The intermediate region 53 is a portion that extends in the arrangement direction of the signal contact members 20A and 20B (in the width direction of the coaxial connector device 11) to couple the first region 51 and the second region 52 to each other. The respective connection portions 59 are provided to be continuous with the first region 51 and the second region 52, and are portions extending upward. The connection portions 59 are portions that are inserted into the insulating housing member 40. The connection portions 59 are inserted into respective insertion openings 49 (refer to FIG. 11A) of the insulating housing member 40, so that the conductive member 50 is fixed to the insulating housing member 40.

Figure 9:
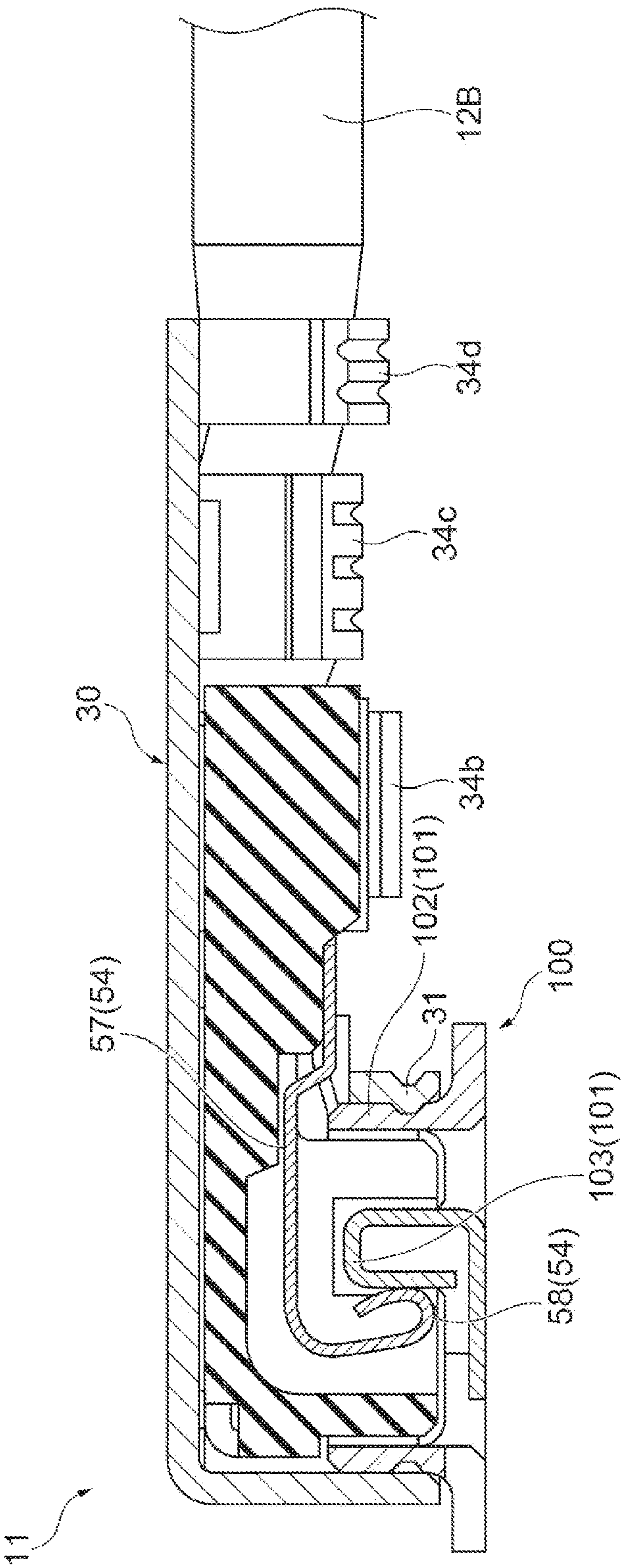
FIG. 9 is a cross-sectional view showing a cross section taken along line IX-IX in FIG. 8.

As shown in FIGS. 3 and 9, the isolation characteristic improving portion 54 includes an extension portion 57 extending from the intermediate region 53 in the extending direction of the coaxial cables 12A and 12B (tip direction of the coaxial cables 12A and 12B), and a contact portion 58 formed in a U shape to extend downward from a tip of the extension portion 57, to be folded back at a lower end, and to extend upward As shown in FIG. 9, the contact portion 58 is connected to (comes into contact with) a contact portion 103 of the ground contact portion 101 disposed between the signal contact portions 104 and 105 of the mating connector device 100. Incidentally, a part of the conductive member 50 is connected to the clamping portions 34*b* that are barrel portions to clamp and hold the coaxial cables 12A and 12B, respectively, through the placement portions 36, but may be directly connected to the clamping portions 34*b* that are barrel portions.

Figure 4:
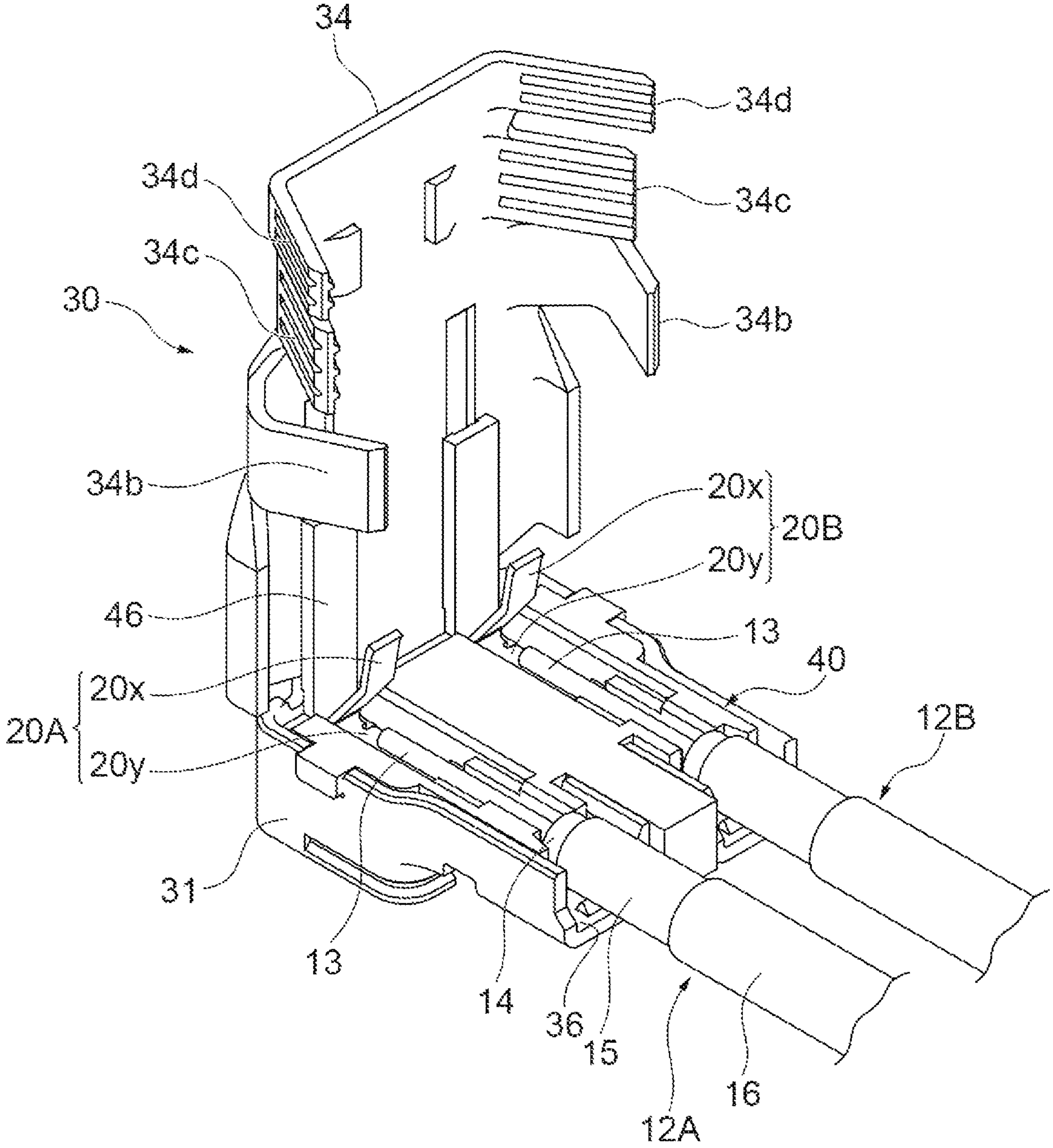
FIG. 4 is a perspective view showing a process of attaching the coaxial connector device according to the present example to one end portions of coaxial cables.

FIG. 4 is a perspective view showing a process of attaching the coaxial connector device 11 according to the present example to the one end portions of the coaxial cables 12A and 12B. When the coaxial connector device 11 is attached to the one end portions of the coaxial cables 12A and 12B, first, as shown in FIG. 2, the center conductors 13 of the coaxial cables 12A and 12B are placed on the respective second portions 20*y* of the signal contact members 20A and 20B. Each of the placed coaxial cables 12A and 12B include the one end portion that is in a state where the skin insulator 16 is partially cut away to expose the outer conductor 15 and each of the outer conductor 15 and the inner insulator 14 is partially cut away to expose the center conductor 13.

Thereafter, the shell portion 34 of the ground contact member 30 that has assumed the upright position is folded with respect to the annular fitting portion 31 of the ground contact member 30 to assume the bent position. Therefore, the shell portion 34 bends the first portions 20*x* through the flat plate portions 46 of the insulating housing member 40, and sandwiches the center conductors 13 between the first portions 20*x* and the second portions 20*y*. Accordingly, the center conductors 13 of the coaxial cables 12A and 12B are connected to the respective signal contact members 20A and 20B. In addition, the shell portion 34 abuts the outer conductors 15 of the coaxial cables 12A and 12B.

Further, thereafter, a pair of the clamping portions 34*b* and 34*b* of the shell portion 34 that has assumed the bent position are folded to clamp the respective placement portions 36 so as to wrap the placement portions 36 from outside, and to clamp the respective outer conductors 15 of the coaxial cables 12A and 12B. In addition, a pair of the clamping portions 34*c* and 34*c* and a pair of the clamping portions 34*d* and 34*d* are folded to clamp the respective outer conductors 15 of and the respective skin insulators 16 of the coaxial cables 12A and 12B. Accordingly, the shell portion 34 of the ground contact member 30 is connected and fixed to the outer conductors 15 of the coaxial cables 12A and 12B.

As a result, as shown in FIGS. 5 and 6, a state where the coaxial connector device 11 is attached to the one end portions of the coaxial cables 12A and 12B is firmly maintained. FIG. 5 is a perspective view from above showing a state where the coaxial connector device 11 according to the present example is attached to the one end portions of the coaxial cables 12A and 12B. FIG. 6 is a bottom view showing a state where the coaxial connector device 11 according to the present example is attached to the one end portions of the coaxial cables 12A and 12B.

FIG. 7 is a perspective view showing the mating connector device 100 to which the coaxial connector device 11 according to the present example is coupled. The mating connector device 100 is fixed onto a mounting surface (not shown) of the circuit board on which components and the like are mounted.

The mating connector device 100 includes the signal contact portions 104 and 105 (a first signal contact portion and a second signal contact portion) and the ground contact portion 101. The signal contact portions 104 and 105 are made of a conductive material, and are electrically connected to respective signal terminals (not shown) provided on the mounting surface of the circuit board. The ground contact portion 101 is electrically connected to a ground potential portion (not shown) provided on the mounting surface of the circuit board. The ground contact portion 101 is formed as an annular body to surround the signal contact portions 104 and 105. The ground contact portion 101 includes the annular fitting portion 102 (first portion) and the contact portion 103 (second portion). The annular fitting portion 102 is fitted and connected to the annular fitting portion 31 of the ground contact member 30. The contact portion 103 is disposed between the signal contact portions 104 and 105, and comes into contact with (is connected to) the contact portion 58 of the isolation characteristic improving portion 54.

Figure 8:
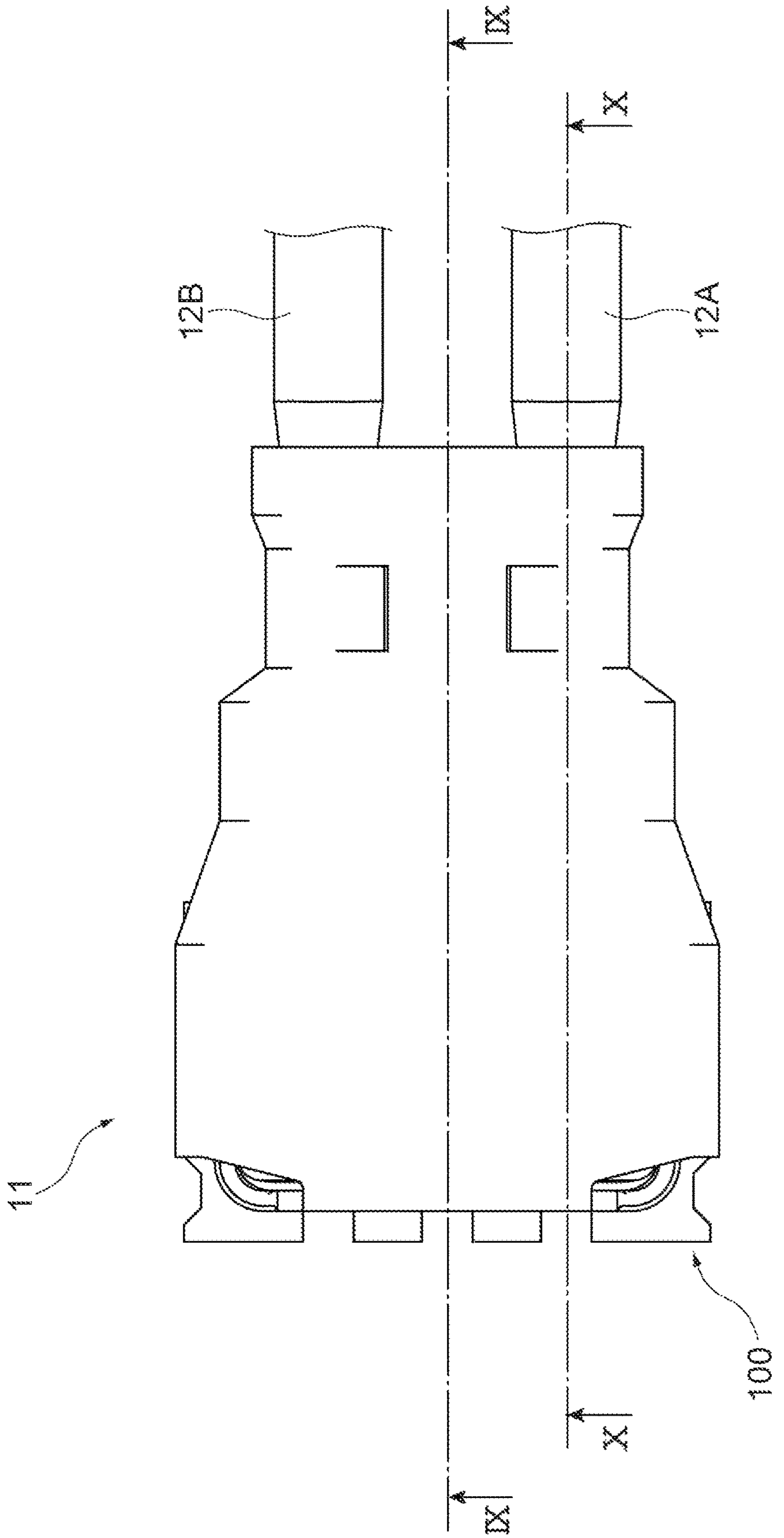
FIG. 8 is a plan view showing a state where the coaxial connector device according to the present example is attached to the one end portions of the coaxial cables and is mechanically and electrically coupled to the mating connector device.

FIG. 8 is a plan view showing a state where the coaxial connector device 11 according to the present example is attached to the one end portions of the coaxial cables 12A and 12B and is mechanically and electrically coupled to the mating connector device 100. FIG. 9 is a cross-sectional view showing a cross section taken along line IX-IX in FIG. 8. FIG. 10 is a cross-sectional view showing a cross section taken along line X-X in FIG. 8. As shown in FIGS. 9 and 10, in a state where the coaxial connector device 11 is coupled to the mating connector device 100, the annular fitting portion 31 of the ground contact member 30 in the coaxial connector device 11 is fitted and connected to the annular fitting portion 102 of the ground contact portion 101 of the mating connector device 100.

In a fitted and connected state, as shown in FIG. 10, the third portion 20*z* of the signal contact member 20A connected to the center conductor 13 of the coaxial cable 12A is brought into contact with (connected to) the signal contact portion 104 of the mating connector device 100. Similarly, the third portion 20*z* of the signal contact member 20B connected to the center conductor 13 of the coaxial cable 12B is brought into contact with (connected to) the signal contact portion 105 of the mating connector device 100. Accordingly, the center conductors 13 of the coaxial cables 12A and 12B are electrically connected to the respective signal terminals (not shown) provided on the mounting surface of the circuit board, through the signal contact members 20A and 20B of the coaxial connector device 11 and through the signal contact portions 104 and 105 of the mating connector device 100.

In addition, in a fitted and connected state, as shown in FIG. 10, the conductive member 50 is in contact with the placement portion 36 of which the protrusion 36*a* is in contact with the outer conductor 15 of the coaxial cable 12A, at the rear ground connection portion 55 of the first region 51, and is in contact with the annular fitting portion 102 of the ground contact portion 101 of the mating connector device 100 at the front ground connection portion 56 of the first region 51. Similarly, the conductive member 50 is in contact with the placement portion 36 of which the protrusion 36*a* is in contact with the outer conductor 15 of the coaxial cable 12B, at the rear ground connection portion 55 of the second region 52, and is in contact with the annular fitting portion 102 of the ground contact portion 101 of the mating connector device 100 at the front ground connection portion 56 of the second region 52. Accordingly, the outer conductors 15 of the coaxial cables 12A and 12B are electrically connected to the ground potential portion (not shown) provided on the circuit board, through the ground contact member 30 of and through the conductive member 50 of the coaxial connector device 11 and through the ground contact portion 101 of the mating connector device 100.

Further, in a fitted and connected state, as shown in FIG. 9, the contact portion 58 of the isolation characteristic improving portion 54 of the conductive member 50 is in contact with the contact portion 103 of the ground contact portion 101 disposed between the signal contact portions 104 and 105 of the mating connector device 100. Accordingly, the isolation characteristic improving portion 54 electrically connected to the ground potential portion (not shown) provided on the circuit board is provided between signal lines related to the coaxial cables 12A and 12B.

Figures 11A, 11B, 11C, 11D:
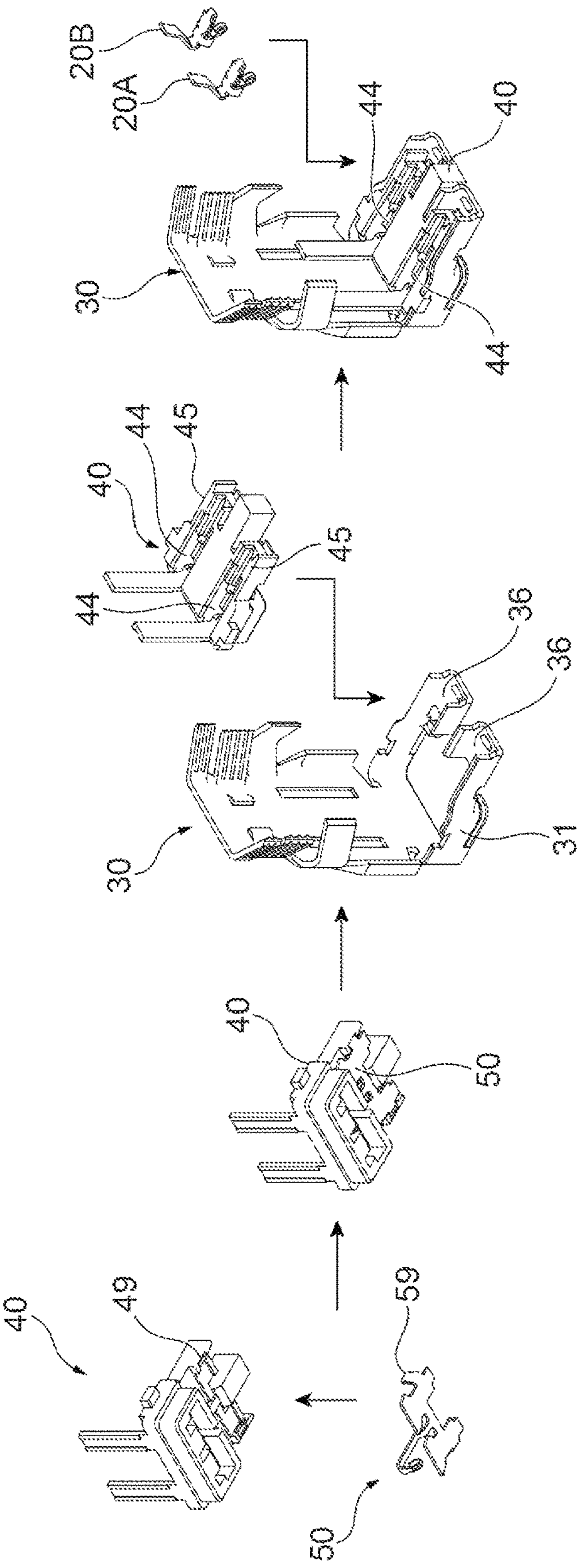
FIGS. 11A to 11D are views for describing a method for assembling the coaxial connector device according to the present example.
Figure 12C:
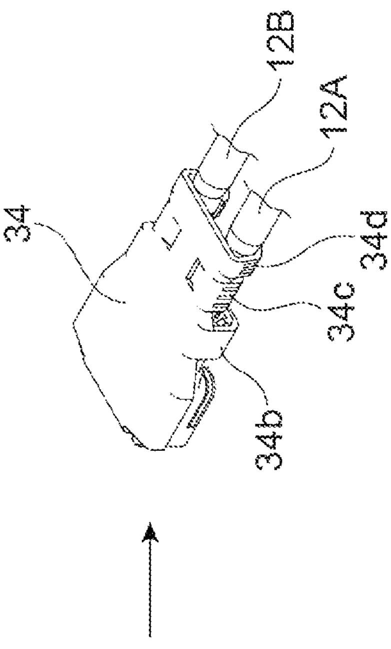
FIGS. 12A to 12C are views for describing the method for assembling the coaxial connector device according to the present example, and are views showing steps following FIG. 11D.
Figure 12B:
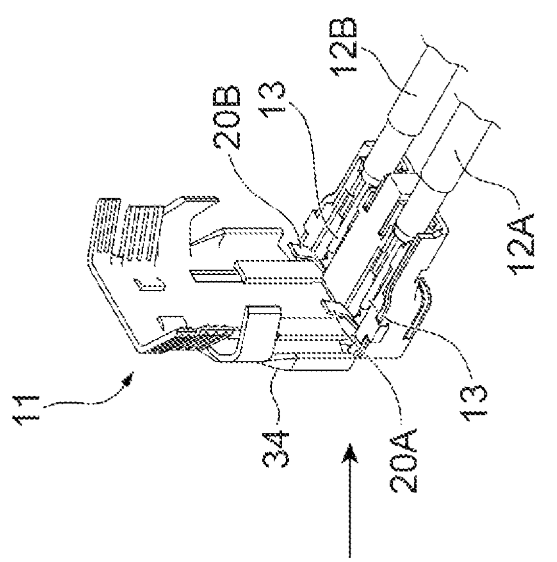
Figure 12A:
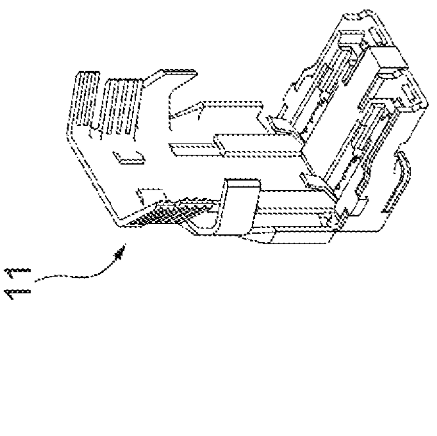

Next, a method for assembling the coaxial connector device 11 according to the present example will be described with reference to FIGS. 11 and 12. FIGS. 11 and 12 are views for describing the method for assembling the coaxial connector device according to the present example, and shows assembly steps in order of FIGS. 11A, 11B, 11C, 11D, 12A, 12B, and 12C.

In an initial step, as shown in FIG. 11A, the conductive member 50 and the insulating housing member 40 are prepared, and as shown in FIG. 11B, the connection portions 59 of the conductive member 50 are inserted into the respective insertion openings 49 of the insulating housing member 40, so that the conductive member 50 and the insulating housing member 40 are integrated.

Subsequently, as shown in FIG. 11C, the insulating housing member 40 with which the conductive member 50 is integrated is assembled to the ground contact member 30. Specifically, the insulating housing member 40 is assembled to the ground contact member 30 such that the tubular portions 44 of the insulating housing member 40 are surrounded by the annular fitting portion 31 of the ground contact member 30 and the center conductor supporting portions 45 of the insulating housing member 40 are placed on the respective placement portions 36 of the ground contact member 30.

Subsequently, as shown in FIG. 11D, the signal contact members 20A and 20B are placed in the respective tubular portions 44 of the insulating housing member 40 assembled to the ground contact member 30. The coaxial connector device 11 shown in FIG. 12A in which the ground contact member 30 assumes the upright position is prepared by the assembly steps up to this point.

Subsequently, as shown in FIG. 12B, the coaxial connector device 11 is attached to the one end portions of the coaxial cables 12A and 12B. Specifically, the center conductors 13 of the coaxial cables 12A and 12B are placed on the respective second portions 20*y* (refer to FIG. 4) of the signal contact members 20A and 20B.

Therefore, the shell portion 34 of the ground contact member 30 that has assumed the upright position comes to assume the bent position, and the clamping portions 34*b*, 34*c*, and 34*d* are folded, so that the center conductors 13 of the coaxial cables 12A and 12B are connected to the respective signal contact members 20A and 20B. In addition, the shell portion 34 of the ground contact member 30 is connected and fixed to the outer conductors 15 of the coaxial cables 12A and 12B. As a result, as shown in FIG. 12C, a state where the coaxial connector device 11 is attached to the one end portions of the coaxial cables 12A and 12B is firmly maintained.

Next, actions and effects of the coaxial connector device 11 according to the present example will be described.

A coaxial connector device 11 according to the present example includes a signal contact member 20A that is connected to a center conductor 13 of a coaxial cable 12A, and that is connected to a signal contact portion 104 of a mating connector device 100 mounted on a circuit board; a signal contact member 20B that is connected to the center conductor 13 of a coaxial cable 12B, and that is connected to a signal contact portion 105 of the mating connector device 100; a ground contact member 30 which includes an annular fitting portion 31 that is fitted and connected to an annular fitting portion 102 of a ground contact portion 101 of the mating connector device, and a shell portion 34 that bendably extends from the annular fitting portion 31 to be connected to outer conductors 15 of the coaxial cable 12A and of the coaxial cable 12B, and to which a ground potential is applied; and a conductive member 50 including a rear ground connection portion 55 that is connected to the ground contact member 30, and a front ground connection portion 56 that is connected to the ground contact portion 101 of the mating connector device 100. When viewed in a direction of fitting to the mating connector device 100, the front ground connection portion 56 of the conductive member 50 overlaps at least a part of a signal line including the center conductor 13 of the coaxial cable 12A and the signal contact member 20A (specifically, a part of the center conductor 13), and at least a part of a signal line including the center conductor 13 of the coaxial cable 12B and the signal contact member 20B (specifically, a part of the center conductor 13).

The coaxial connector device 11 according to the present example includes the signal contact member 20A connected to the center conductor 13 of the coaxial cable 12A; the signal contact member 20B connected to the center conductor 13 of the coaxial cable 12B; the ground contact member 30 to which a ground potential is applied; and the conductive member 50. The rear ground connection portion 55 of the conductive member 50 is connected to the ground contact member 30, and the front ground connection portion 56 is connected to the ground contact portion 101 of the mating connector device 100. Furthermore, in the coaxial connector device 11, when viewed in the direction of fitting, the front ground connection portion 56 overlaps at least a part of the signal line including the center conductor 13 of the coaxial cable 12A and the signal contact member 20A, and at least a part of the signal line including the center conductor 13 of the coaxial cable 12B and the signal contact member 20B. Since the front ground connection portion 56 overlaps at least a part of these signal lines, signals of these signal lines are prevented from propagating to the outside (surroundings of the coaxial connector device 11). As a result, signals of the signal lines can be prevented from becoming noise and affecting surrounding external products, EMI characteristics of the coaxial connector device 11 can be improved, and noise resistance can be improved.

The shell portion 34 of the ground contact member 30 may include clamping portions 34*b* (barrel portions) that clamp and hold the coaxial cable 12A and the coaxial cable 12B, respectively, and the conductive member 50 may be connected to the clamping portions 34*b*. In such a manner, since the clamping portions 34*b* that hold the coaxial cables 12A and 12B forming the signal lines and the conductive member 50 are connected to (in contact with) each other, contact locations can be reliably set to a ground potential, and portions at which the signal lines and the conductive member 50 (specifically, the front ground connection portion 56) overlap each other can be suitably formed.

The ground contact portion 101 of the mating connector device 100 may include the annular fitting portion 102 that is fitted and connected to the annular fitting portion 31 of the ground contact member 30. The conductive member 50 may include a pair of the front ground connection portions 56 that are connected to the annular fitting portion 102. One of the pair of front ground connection portions 56 may overlap at least a part of one signal line when viewed in the direction of fitting, and the other of the pair of front ground connection portions 56 may overlap at least a part of the other signal line when viewed in the direction of fitting. In such a manner, since the pair of front ground connection portions 56 are connected to a portion related to fitting (annular fitting portion 102) in the ground contact portion 101 of the mating connector device 100, in a state where the pair of front ground connection portions 56 are fitted to the mating connector device 100, a contact location can be reliably set to a ground potential. Furthermore, since one of the pair of front ground connection portions 56 overlaps at least a part of the one signal line, and the other of the pair of front ground connection portions 56 overlaps at least a part of the other signal line, signals of both the signal lines can be reliably prevented from propagating to the outside (surroundings of the coaxial connector device 11).

The shell portion 34 of the ground contact member 30 may include clamping portions 34*b* that clamp and hold the coaxial cable 12A and the coaxial cable 12B, respectively. When viewed in the direction of fitting, the pair of front ground connection portions 56 may overlap the clamping portions 34*b* in an arrangement direction of the signal contact members 20A and 20B. In such a manner, since the pair of front ground connection portions 56 and the clamping portions 34*b* that hold the coaxial cables 12A and 12B overlap each other, portions at which the pair of front ground connection portions 56 and the signal lines (specifically, the center conductors 13 of the coaxial cables 12A and 12B) overlap each other can be suitably formed. As a result, signals of both the signal lines can be appropriately prevented from propagating to the outside (surroundings of the coaxial connector device 11).

An opening portion OP1 may be formed in the annular fitting portion 31 of the ground contact member 30, and the pair of front ground connection portions 56 may be disposed in the opening portion OP1. In such a manner, for example, since the pair of front ground connection portions 56 forming the conductive member 50 are provided in the opening portion OP1 that is formed in a process of manufacturing, the opening portion OP1 is partially closed by the pair of front ground connection portions 56, so that signals (high-frequency signals) of the signal lines can be effectively prevented from leaking from the opening portion OP1 to the outside.

The ground contact portion 101 of the mating connector device 100 may include a contact portion 103 disposed between the signal contact portion 104 and the signal contact portion 105, and the conductive member 50 may include an isolation characteristic improving portion 54 that is connected to the contact portion 103. Since the isolation characteristic improving portion 54 is connected to the contact portion 103 of the ground contact portion 101 of the mating connector device 100 disposed between the signal contact portion 104 and the signal contact portion 105, signals are prevented from propagating between the signal contact members 20A and 20B that are different from each other. As a result, an isolation characteristic can be improved, and noise resistance can be improved.

Figure 13:
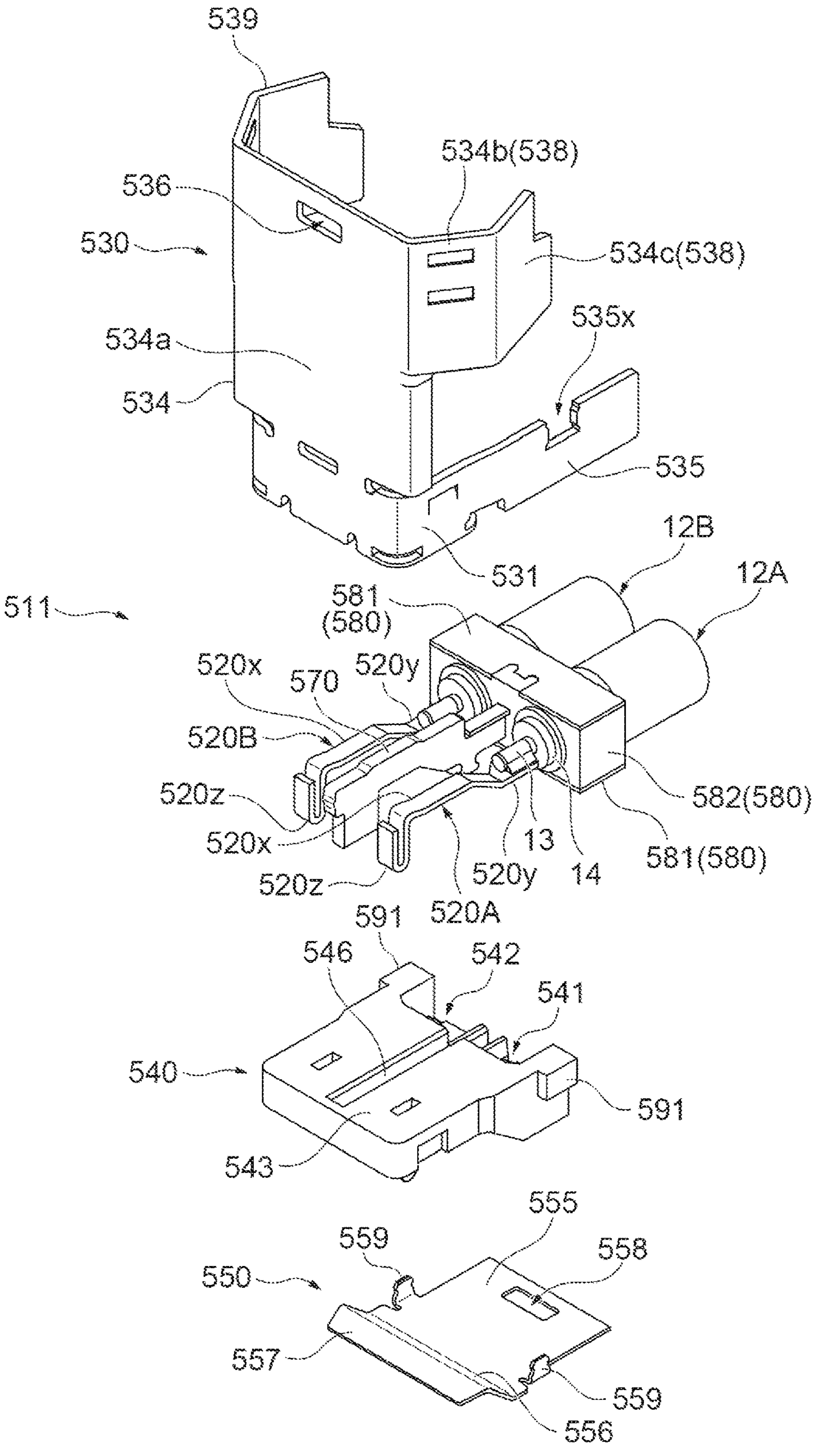
FIG. 13 is an exploded perspective view from above showing a coaxial connector device according to another aspect of the present example.
Figure 14:
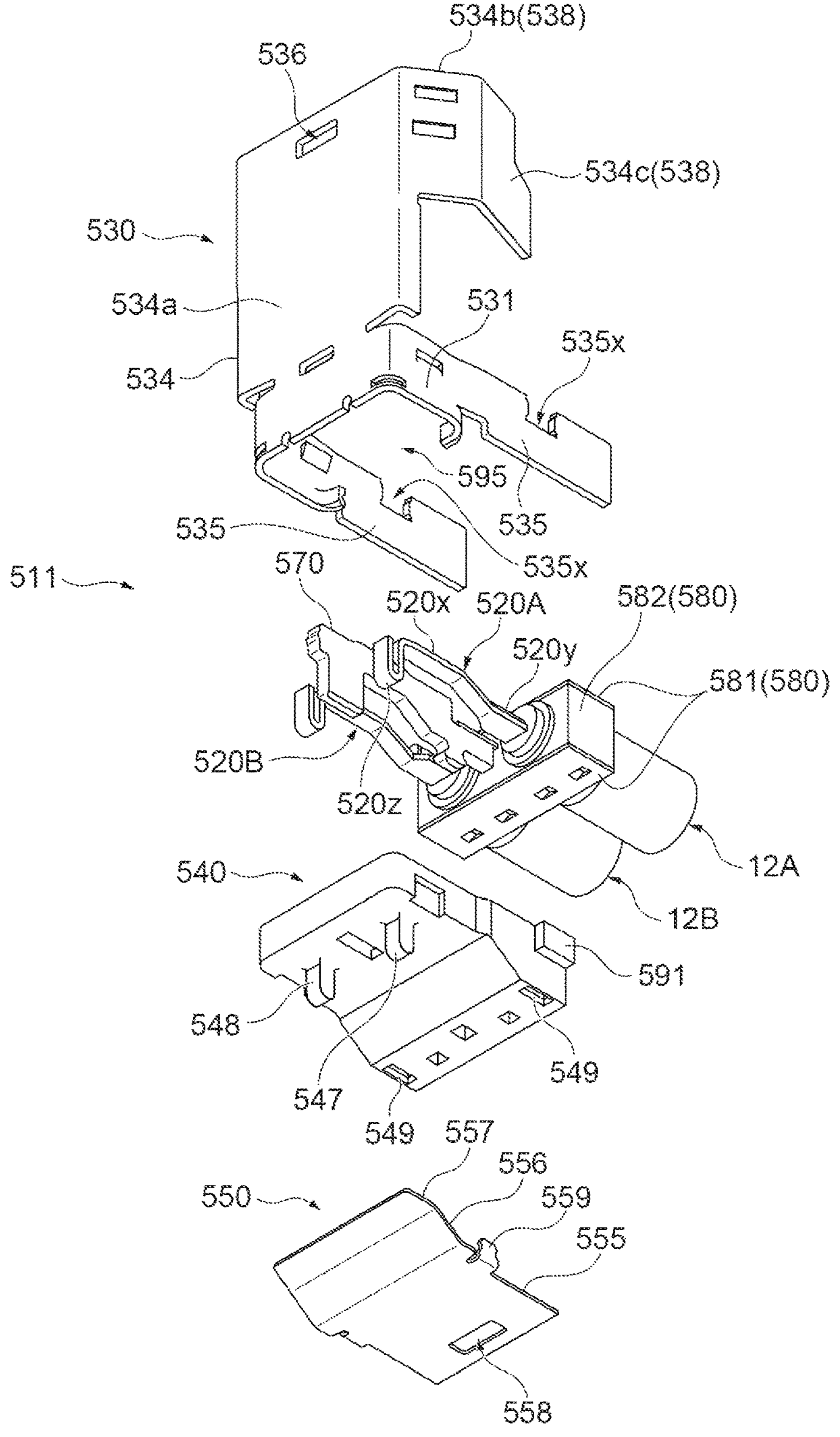
FIG. 14 is an exploded perspective view from below showing the coaxial connector device of FIG. 13.
Figure 15A:
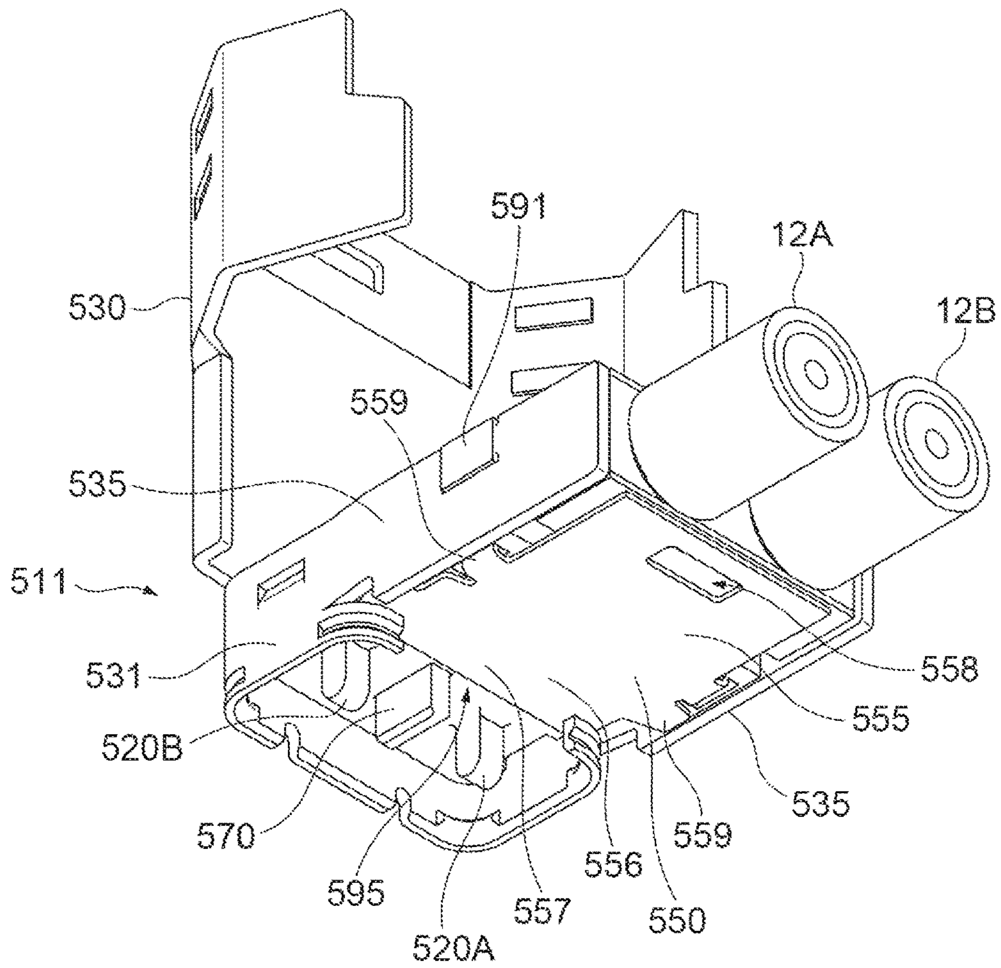
FIG. 15A is a perspective view from below showing a state where the coaxial connector device of FIG. 13 is attached to one end portions of coaxial cables, and is a view showing a state before a shell portion holds a cable fixing portion.
Figure 15B:
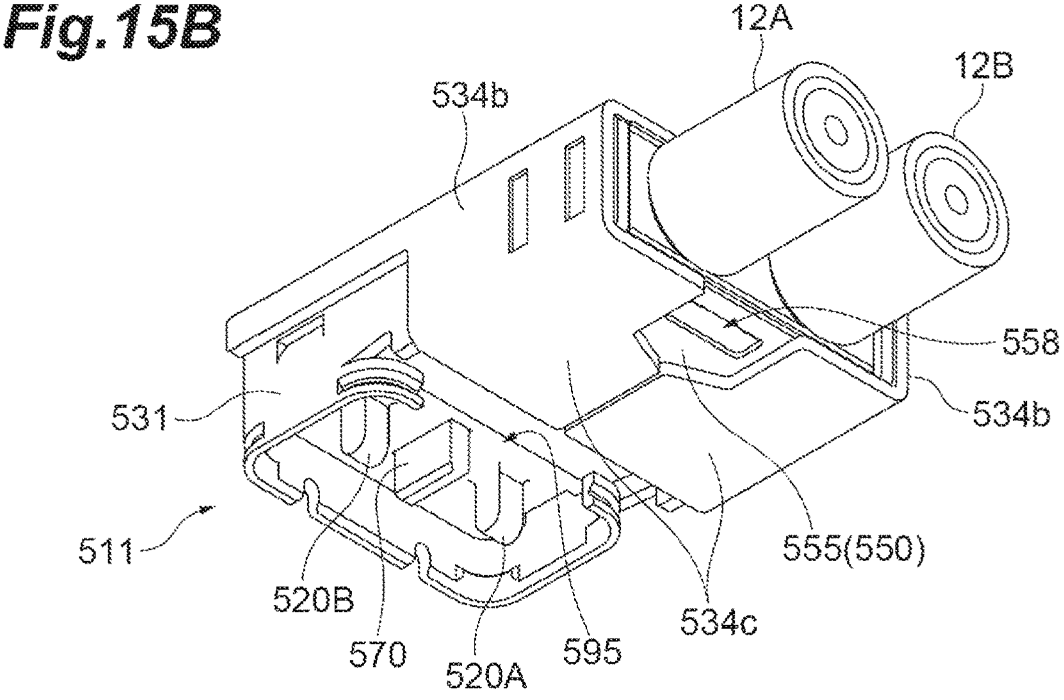
FIG. 15B is a perspective view from below showing a state where the coaxial connector device of FIG. 13 is attached to the one end portions of the coaxial cables, and is a view showing a state where the shell portion holds the cable fixing portion.

An aspect according to the present disclosure is not limited to the above example. FIGS. 13 and 14 are exploded perspective views showing a coaxial connector device 511 according to another aspect of the present example. FIG. 15 is a perspective view from below showing a state where the coaxial connector device 511 is attached to one end portions of coaxial cables. Hereinafter, among configurations of the coaxial connector device 511, configuration different from those of the coaxial connector device 11 according to the above example will be mainly described, and a description of configurations common to (corresponding to) the coaxial connector device 11 may not be repeated.

As shown in FIGS. 13 to 15, the coaxial connector device 511 includes, as main components, two signal contact members 520A and 520B (a first signal contact member and a second signal contact member), a ground contact member 530, and a conductive member 550. In addition, the coaxial connector device 511 may include an insulating housing 540.

The insulating housing 540 supports the signal contact members 520A and 520B and the ground contact member 530 in a mutually insulated state. The insulating housing 540 includes a first supporting portion 541 related to supporting the signal contact member 520A (refer to FIG. 19C); a second supporting portion 542 related to supporting the signal contact member 520B (refer to FIG. 19C); and a base portion 543. The first supporting portion 541 and the second supporting portion 542 are disposed adjacent to each other in a width direction of the coaxial connector device 511.

Protrusion portions 591 protruding outward in the width direction are formed on respective outer surfaces of the first supporting portion 541 and of the second supporting portion 542 in the width direction. The protrusion portions 591 are portions that are fitted to respective recessed portions 535*x* (details will be described later) of arm portions 535 of the ground contact member 530 to fix a position of the insulating housing 540 with respect to the ground contact member 530 when the coaxial connector device 511 is assembled (refer to FIGS. 19C and 19D).

As shown in FIG. 14, insertion openings 549 that are recessed portions are formed in both respective end portions of lower surfaces of the first supporting portion 541 and of the second supporting portion 542 in the width direction. The insertion openings 549 are portions into which respective connection portions 559 (details will be described later) of the conductive member 550 are inserted. The connection portions 559 are inserted into the respective insertion openings 549 to fix a position of the conductive member 550 with respect to the insulating housing 540.

As shown in FIG. 13, the base portion 543 is a portion that is continuous with the first supporting portion 541 and with the second supporting portion 542 in the extending direction of the coaxial cables 12A and 12B, and is a portion located closer to the tip direction (front direction) of the coaxial cables 12A and 12B than the first supporting portion 541 and the second supporting portion 542. A recessed portion 546 for fixing an isolation characteristic improving portion 570 to be described later is formed in a central portion of the base portion 543 in the width direction of the coaxial connector device 511. The recessed portion 546 is formed along the extending direction of the coaxial cables 12A and 12B from a portion interposed between the first supporting portion 541 and the second supporting portion 542 to a tip portion of the base portion 543.

As shown in FIG. 14, contact fixing portions 547 and 548 extending downward are formed at respective tip portions of a lower surface of the base portion 543. The contact fixing portion 547 is a portion around which a third portion 520*z* (details will be described later) of the signal contact member 520A extending to penetrate through an inside of the base portion 543 is wound, and to which the third portion 520*z* is fixed. The contact fixing portion 548 is a portion around which the third portion 520*z* (details will be described later) of the signal contact member 520B extending to penetrate through the inside of the base portion 543 is wound, and to which the third portion 520*z* is fixed (refer to FIG. 18C).

A ground potential is applied to the ground contact member 530, and the ground contact member 530 is electrically connected to the outer conductors 15 of the coaxial cables 12A and 12B through a ground bar 581 (details will be described later) (refer to FIG. 18C). The ground contact member 530 includes an annular fitting portion 531, a pair of the arm portions 535 and 535, and a shell portion 534.

Figure 16:
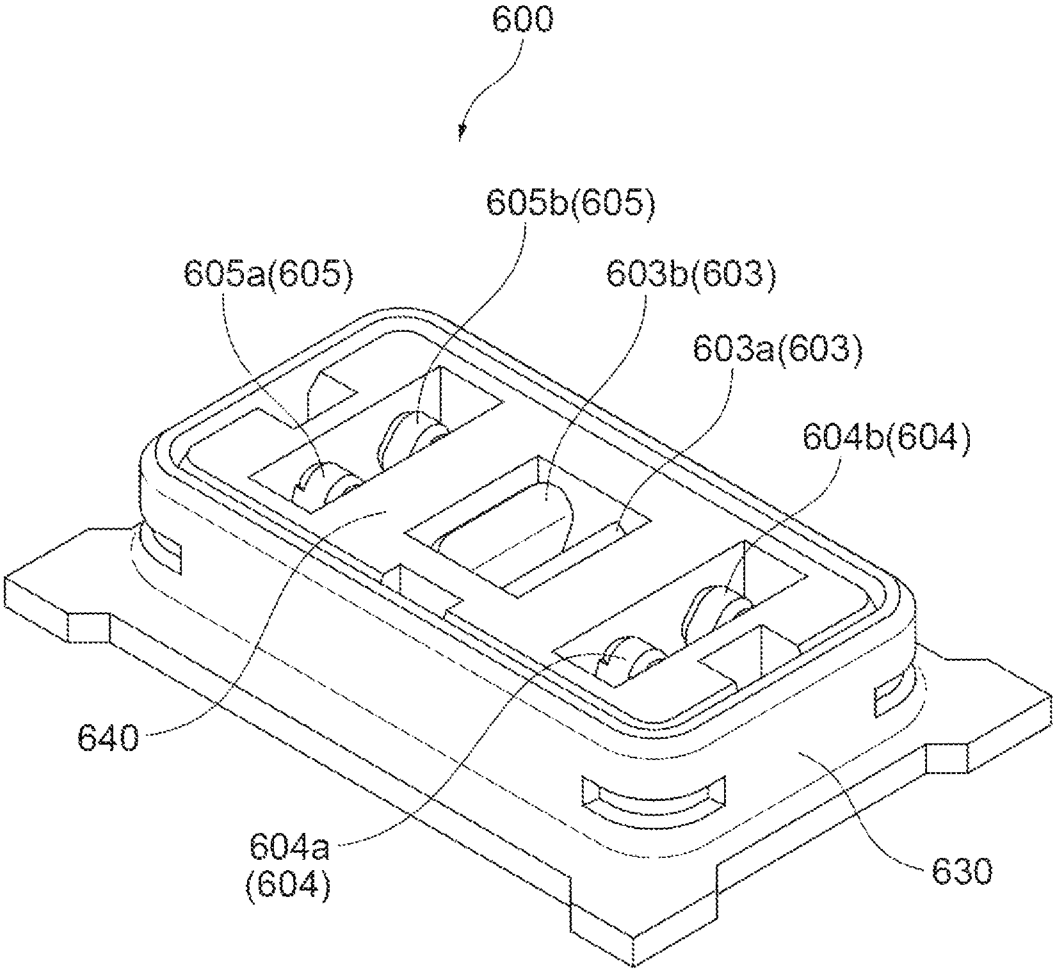
FIG. 16 is a perspective view showing a mating connector device to which the coaxial connector device of FIG. 13 is coupled.

The annular fitting portion 531 is a portion that partially surrounds a part of the insulating housing 540 (specifically, the base portion 543), and that is fitted and connected to an annular fitting portion 630 forming a ground contact portion of a mating connector device 600 (refer to FIG. 16). The annular fitting portion 531 is formed in a substantially cylindrical shape, and a rear end portion thereof is not continuous, and an opening portion 595 is formed in the annular fitting portion 531 (refer to FIG. 15).

The pair of arm portions 535 and 535 are portions that are continuous with the annular fitting portion 531, and that extend along the extending direction of the coaxial cables 12A and 12B while facing each other in the width direction of the coaxial connector device 511. One arm portion 535 extends along an outer surface of the first supporting portion 541 in the extending direction. The other arm portion 535 extends along an outer surface of the second supporting portion 542 in the extending direction. The recessed portion 535*x* that is fitted to the protrusion portion 591 of the insulating housing 540 is formed in each of the pair of arm portions 535 and 535.

The shell portion 534 includes a base plate 534*a* covering an upper surface of the annular fitting portion 531; a first fixing portion 538 (barrel portion) related to fixing the coaxial cable 12A; and a second fixing portion 539 (barrel portion) related to fixing the coaxial cable 12B. The base plate 534*a* is continuous with a tip of the annular fitting portion 531, and extends rearward to a position where the base plate 534*a* covers the upper ground bar 581 (details will be described later) of a cable fixing portion 580 (details will be described later), at the bent position.

The first fixing portion 538 holds the coaxial cable 12A. The first fixing portion 538 is a portion that extends continuously from an outer edge portion of a rear end portion (portion behind a portion of the base plate 534*a* covering the upper surface of the annular fitting portion 531) of the base plate 534*a* in the width direction. The first fixing portion 538 is foldably configured, and includes a clamping portion 534*b* covering the arm portion 535 from outside in the width direction, and a clamping portion 534*c* covering the cable fixing portion 580 (lower ground bar 581 to be described in detail later) from below, at the bent position. The clamping portion 534*b* is folded at a location where the clamping portion 534*b* is continuous with the base plate 534*a*, to cover the arm portion 535. The clamping portion 534*c* is folded at a location where the clamping portion 534*c* is continuous with the clamping portion 534*b*, to cover the lower ground bar 581. In such a manner, the first fixing portion 538 covers and holds the cable fixing portion 580 instead of directly clamping the coaxial cable 12A, to hold the coaxial cable 12A fixed by the cable fixing portion 580. A configuration of the second fixing portion 539 is the same as the configuration of the first fixing portion 538 (the coaxial cable 12A is replaced with the coaxial cable 12B, and the same in that the clamping portions 534*b* and 534*c* are provided). Namely, the second fixing portion 539 covers and holds the cable fixing portion 580 instead of directly clamping the coaxial cable 12B, to hold the coaxial cable 12B fixed by the cable fixing portion 580.

The cable fixing portion 580 is configured to fix the coaxial cables 12A and 12B. The cable fixing portion 580 includes the ground bars 581 and 581 each having a plate shape and facing each other in an up-down direction, and a solder portion 582 that fixes the coaxial cables 12A and 12B by filling a gap between the ground bars 581 and 581 and the coaxial cables 12A and 12B therewith. The filling of the solder portion 582 is performed to cover the outer conductors 15, and the ground bars 581 and 581 cover an upper surface of and a lower surface of the solder portion 582, so that the ground bars 581 and 581 and the outer conductors 15 are electrically connected to each other.

A tip portion of a central portion of the upper ground bar 581 in the width direction is folded in a down direction, passes through an inside of the solder portion 582, and is connected to the isolation characteristic improving portion 570 (details will be described later) (refer to FIG. 18B). In such a manner, one ground bar 581 and the isolation characteristic improving portion 570 are in contact with each other, so that the isolation characteristic improving portion 570 is electrically connected to the outer conductors 15 of the coaxial cables 12A and 12B through the ground bar 581.

The signal contact member 520A is a conductive member that is connected to the center conductor 13 of the coaxial cable 12A, and that is connected to a signal contact portion 604 (refer to FIG. 16) of the mating connector device 600. The signal contact member 520B is connected to the center conductor 13 of the coaxial cable 12B, and is connected to a signal contact portion 605 (refer to FIG. 16) of the mating connector device 600.

The signal contact member 520A includes a first portion 520*x*, a second portion 520*y*, and the third portion 520*z*. The signal contact member 520A is supported by the first supporting portion 541. The second portion 520*y* is a portion extending in the extending direction of the coaxial cable 12A, and is a portion that comes into contact with the center conductor 13 of the coaxial cable 12A through an upper surface of the second portion 520*y*. The first portion 520*x* is a portion that is continuous with a tip of the second portion 520*y* and that extends forward. The first portion 520*x* includes a portion that is continuous with the tip of the second portion 520*y* and that extends to be inclined in an up direction, and a portion that is continuous with the portion extending to be inclined and that extends horizontally. The third portion 520*z* is a portion formed in a U shape that is continuous with a tip of the first portion 520*x*, and that extends downward, is folded at a lower end of a portion extending downward, and extends upward. The third portion 520*z* is connected to the signal contact portion 604 (refer to FIG. 16) of the mating connector device 600 at a portion formed in a U shape. A configuration of the signal contact member 520B is same as the configuration of the signal contact member 520A (the coaxial cable 12A is replaced with the coaxial cable 12B, and the same in that the first portion 520*x*, the second portion 520*y*, and the third portion 520*z* are provided).

The conductive member 550 includes a rear ground connection portion 555 (first ground connection portion); an inclined portion 556 that is continuous with the rear ground connection portion 555; and a front ground connection portion 557 (a second ground connection portion and a first connection portion) that is continuous with the inclined portion 556.

Figure 18A:
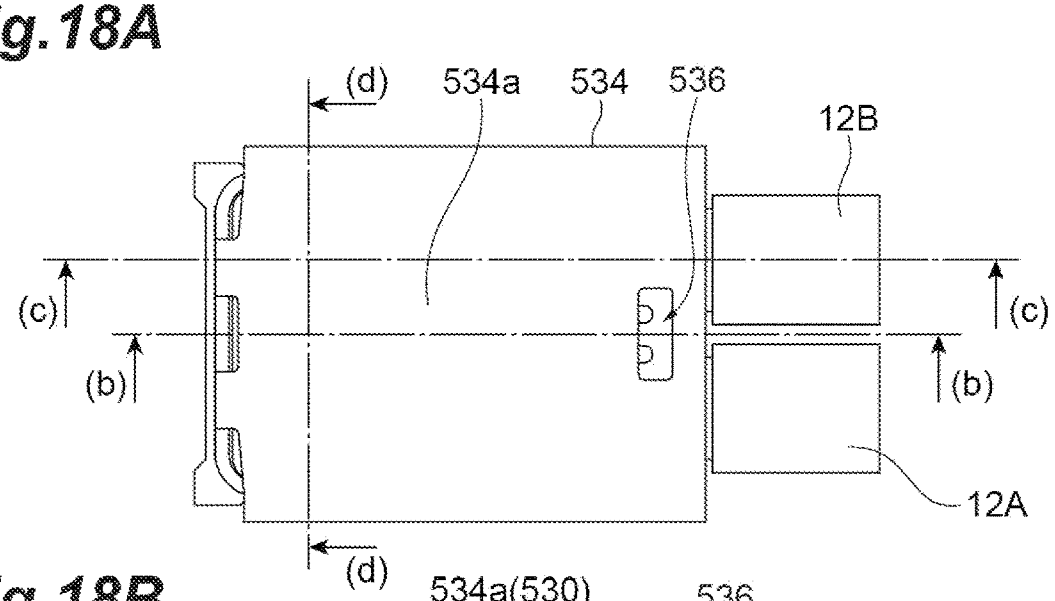
FIG. 18A is a plan view showing a state where the coaxial connector device of FIG. 13 is attached to the one end portions of the coaxial cables and is mechanically and electrically coupled to the mating connector device.
Figure 18B:
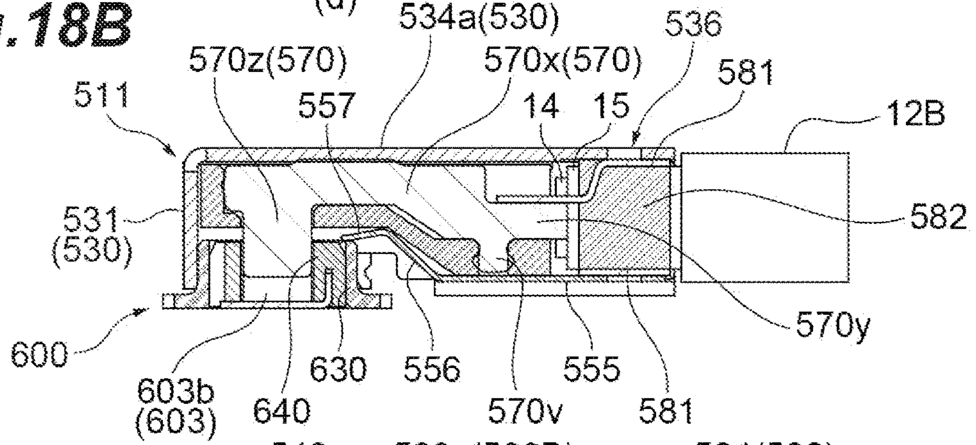
FIG. 18B is a cross-sectional view taken along line B-B of FIG. 18A.
Figure 18C:
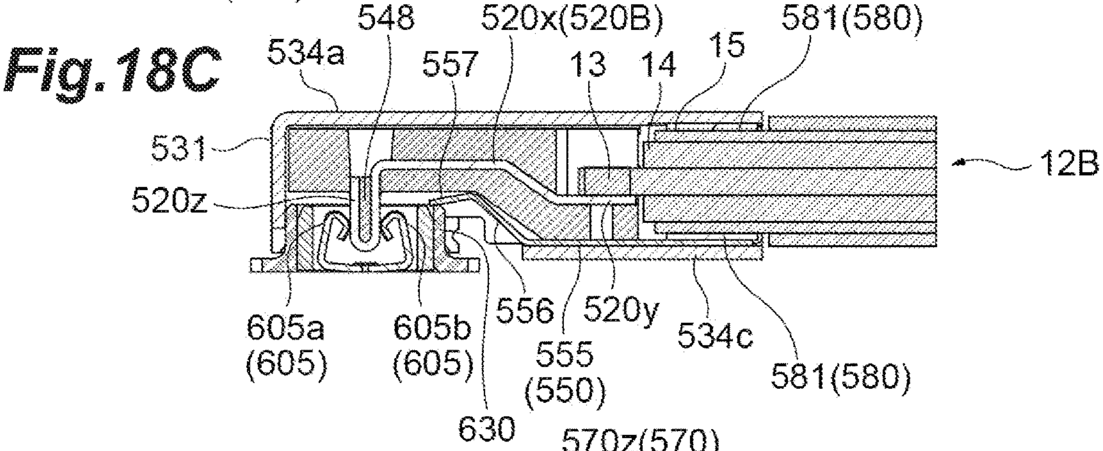
FIG. 18C is a cross-sectional view taken along line C-C of FIG. 18A.

The rear ground connection portion 555 is a flat plate-shaped portion that is connected to (comes into contact with) the ground contact member 530, specifically, the clamping portions 534*c* of the first fixing portion 538 and of the second fixing portion 539 (refer to FIG. 18C). A cutout 558 is formed in a central portion of a rear end of the rear ground connection portion 555 in the width direction. The cutout 558 is filled with solder, so that the lower ground bar 581 and the conductive member 550 are electrically connected to each other. Accordingly, an improvement in shieldability caused by reliable contact and mechanical connection caused by strong connection are ensured. Incidentally, as shown in FIG. 18B, a pass-through portion 536 of the base plate 534*a* is filled with solder, so that the upper ground bar 581 and the ground contact member 530 are electrically connected to each other. Such soldering is performed after the caulking of the first fixing portion 538 (barrel portion) and the second fixing portion 539 that are barrel portions. The connection portions 559 protruding upward are provided at both respective end portions of a front end portion of the rear ground connection portion 555 in the width direction. The connection portions 559 are inserted into the respective insertion openings 549 of the insulating housing 540 to fix a position of the rear ground connection portion 555 with respect to the insulating housing 540. The inclined portion 556 is a portion that is continuous with a front end of the rear ground connection portion 555 and that extends forward while being inclined, and has a shape inclined in an upward diagonal direction according to an inclined shape of a lower surface of the insulating housing 540.

The front ground connection portion 557 is a flat plate-shaped portion that is connected to (comes into contact with) the annular fitting portion 630 (first portion) forming the ground contact portion of the mating connector device 600 (refer to FIG. 18C). The front ground connection portion 557 is a portion that is continuous with a front end of the inclined portion 556, and that extends forward while being inclined downward. A tip portion of the front ground connection portion 557 is disposed in the opening portion 595 (refer to FIG. 15) of the annular fitting portion 531, and the front ground connection portion 557 is connected to the annular fitting portion 630 at the tip portion thereof (refer to FIG. 18C). The front ground connection portion 557 is continuously formed in the width direction that is an arrangement direction of the signal contact member 520A and the signal contact member 520B. Being continuously formed mentioned here refers to being formed without a cutout, a gap, or the like formed. Furthermore, when viewed in the direction of fitting, the front ground connection portion 557 overlaps at least a part (both sides in the present example) of two signal lines.

Further, the conductive member 550 includes the isolation characteristic improving portion 570 (the second ground connection portion and a second connection portion) formed of a member separate from the plate-shaped member including the rear ground connection portion 555, the inclined portion 556, and the front ground connection portion 557 described above. In such a manner, the isolation characteristic improving portion 570 is formed of a member separate from other regions (front ground connection portion 557) and the like in the second ground connection portion.

The isolation characteristic improving portion 570 is configured to extend in the extending direction of the signal contact member 520A and of the signal contact member 520B between the signal contact member 520A and the signal contact member 520B, and to prevent signals from propagating between the signal contact member 520A and the signal contact member 520B. The isolation characteristic improving portion 570 is a wall-shaped member having surfaces facing the respective signal contact members 520A and 520B. The isolation characteristic improving portion 570 is disposed between the signal contact member 520A and the signal contact member 520B to block at least a part of a region between the signal contact member 520A and the signal contact member 520B.

As shown in FIG. 18B, the isolation characteristic improving portion 570 may be disposed between the signal contact member 520A and the signal contact member 520B to block an entirety of the region between the signal contact member 520A and the signal contact member 520B. As shown in FIGS. 18B and 18C, an area of the isolation characteristic improving portion 570 when viewed in the width direction is larger than an area of each of the signal contact member 520A and the signal contact member 520B when viewed in the width direction.

As shown in FIG. 18B, the isolation characteristic improving portion 570 includes a first portion 570*x*, a second portion 570*y*, a third portion 570*z*, and a fourth portion 570*v*. The second portion 570*y* is a portion extending along the second portions 520*y* of the signal contact members 520A and 520B, and is connected to the ground bar 581 electrically connected to the outer conductors 15 of the coaxial cables 12A and 12B, through an upper surface of the second portion 570*y*. The first portion 570*x* is a portion extending along the first portions 520*x* of the signal contact members 520A and 520B. At least a part of an upper end portion of the first portion 570*x* is in contact with the base plate 534*a* of the shell portion 534 (refer to FIG. 18B). The third portion 570*z* is a portion extending downward along the third portions 520*z* of the signal contact members 520A and 520B. The third portion 570*z* is connected to (comes into contact with) a contact portion 603 of the ground contact portion of the mating connector device 600. The fourth portion 570*v* is a portion that is continuous with the first portion 570*x* and that extends downward, and is a portion that is press-fitted into the insulating housing 540.

Figure 17:
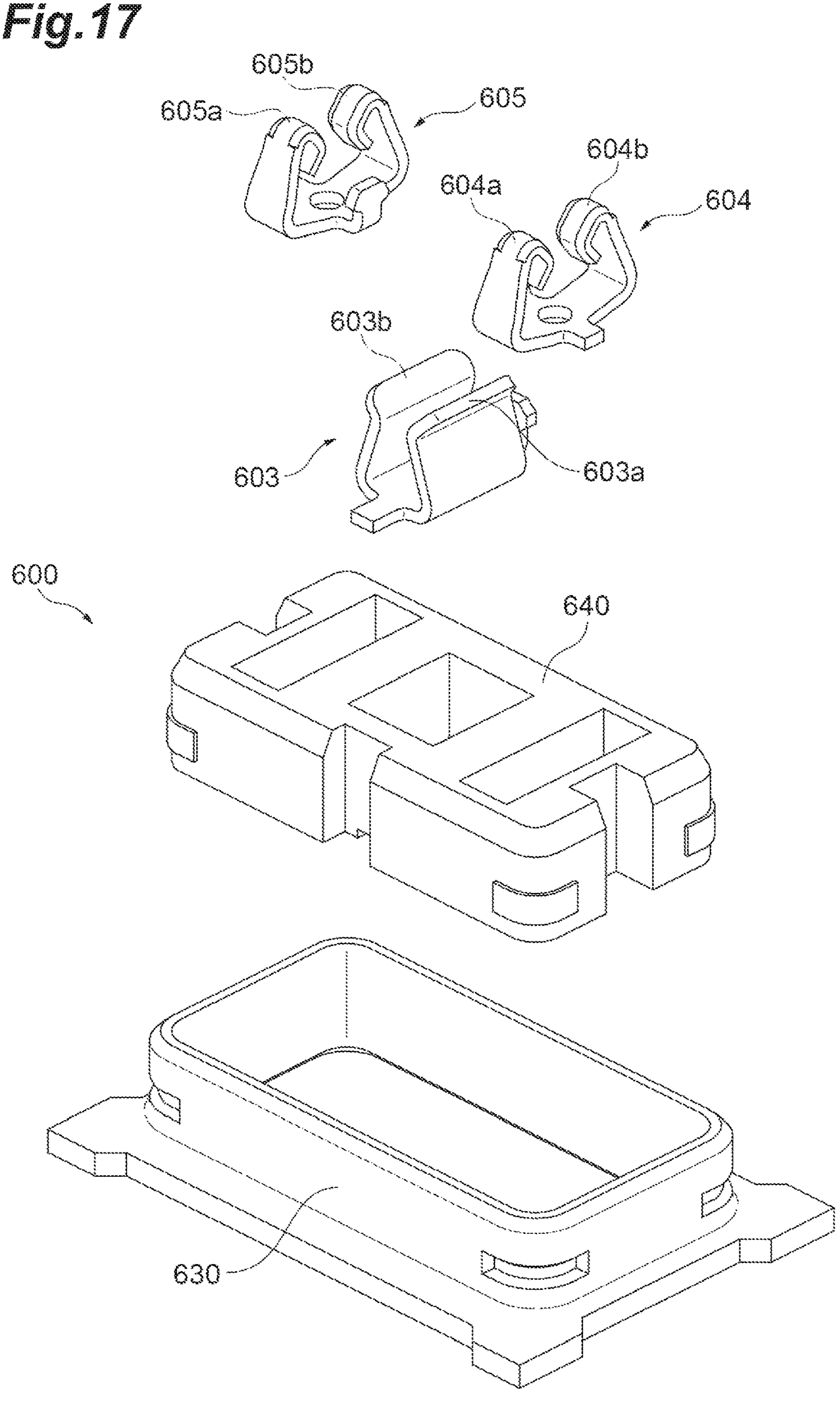
FIG. 17 is an exploded perspective view from above showing the mating connector device of FIG. 16.

FIG. 16 is a perspective view showing the mating connector device 600 to which the coaxial connector device 511 is coupled. FIG. 17 is an exploded perspective view from above showing the mating connector device 600 of FIG. 16.

As shown in FIGS. 16 and 17, the mating connector device 600 includes the signal contact portions 604 and 605 (a first signal contact portion and a second signal contact portion), the annular fitting portion 630 and the contact portion 603 that form the ground contact portion, and an insulating housing 640.

The insulating housing 640 supports the signal contact portions 604 and 605 and the annular fitting portion 630 and the contact portion 603 that form the ground contact portion, in a mutually insulated state. The signal contact portion 604 includes a pair of contact portions 604*a* and 604*b*. The contact portions 604*a* and 604*b* come into contact with (are connected to) the third portions 520*z* of the signal contact member 520A so as to sandwich the third portion 520*z* therebetween. The signal contact portion 605 includes a pair of contact portions 605*a* and 605*b*. The contact portions 605*a* and 605*b* come into contact with (are connected to) the third portions 520*z* of the signal contact member 520B so as to sandwich the third portion 520*z* therebetween.

The contact portion 603 includes a pair of contact portions 603*a* and 603*b*. The contact portions 603*a* and 603*b* come into contact with (are connected to) the third portion 570*z* of the isolation characteristic improving portion 570 so as to sandwich the third portion 570*z* therebetween. The annular fitting portion 630 is fitted and connected to the annular fitting portion 531 of the ground contact member 530.

Figure 18D:
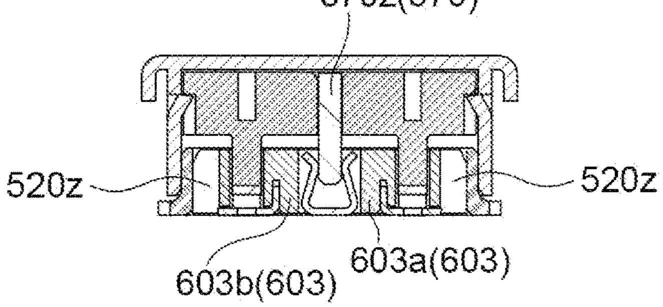
FIG. 18D is a cross-sectional view taken along line D-D of FIG. 18A.

FIG. 18A is a plan view showing a state where the coaxial connector device 511 is attached to the one end portions of the coaxial cables 12A and 12B and is mechanically and electrically coupled to the mating connector device 600. FIG. 18B is a cross-sectional view taken along line B-B of FIG. 18A. FIG. 18C is a cross-sectional view taken along line C-C of FIG. 18A. FIG. 18D is a cross-sectional view taken along line D-D of FIG. 18A.

As shown in FIGS. 18B and 18C, in a state where the coaxial connector device 511 is coupled to the mating connector device 600, the annular fitting portion 531 of the ground contact member 530 in the coaxial connector device 511 is fitted and connected to the annular fitting portion 630 of the ground contact portion of the mating connector device 600.

In a fitted and connected state, as shown in FIG. 18C, the third portion 520*z* of the signal contact member 520B to which the second portion 520*y* and the center conductor 13 of the coaxial cable 12B are connected comes into contact with the pair of contact portions 605*a* and 605*b* of the signal contact portion 605 of the mating connector device 600 (as for the signal contact member 520A, comes into contact with the pair of contact portions 604*a* and 604*b* of the signal contact portion 604). Accordingly, the center conductors 13 of the coaxial cables 12A and 12B are electrically connected to signal terminals (not shown) provided on a mounting surface of a circuit board through the signal contact members 520A and 520B of the coaxial connector device 511 and through the signal contact portions 604 and 605 of the mating connector device 600.

In addition, in a fitted and connected state, as shown in FIG. 18C, the rear ground connection portion 555 of the conductive member 550 is in contact with the clamping portions 534*c* of the ground contact member 530 and with the ground bar 581 of the cable fixing portion 580, and the front ground connection portion 557 is in contact with the annular fitting portion 630 forming the ground contact portion of the mating connector device 600. The ground bar 581 is electrically connected to the outer conductors 15 of the coaxial cables 12A and 12B. Accordingly, the outer conductors 15 of the coaxial cables 12A and 12B are electrically connected to a ground potential portion (not shown) provided on the circuit board, through the ground contact member 530 of and through the conductive member 550 of the coaxial connector device 511 and through the annular fitting portion 630 of the mating connector device 600.

Further, in a fitted and connected state, as shown in FIG. 18B, the isolation characteristic improving portion 570 connected to the ground bar 581 extends in the extending direction of the signal contact member 520A and of the signal contact member 520B between the signal contact member 520A and the signal contact member 520B, and is disposed between the signal contact member 520A and the signal contact member 520B. Furthermore, the third portion 570*z* of the isolation characteristic improving portion 570 is in contact with the pair of contact portions 603*a* and 603*b* of the contact portion 603 of the ground contact portion of the mating connector device 600. Accordingly, the isolation characteristic improving portion 570 is provided between the signal lines to prevent signals from propagating between the signal lines. Incidentally, the isolation characteristic improving portion 570 is electrically connected to the ground potential portion (not shown) provided on the circuit board.

Next, a method for assembling the coaxial connector device 511 will be described with reference to FIGS. 19 and 20. FIGS. 19A to 19D are views for describing the method for assembling the coaxial connector device 511. FIGS. 20A and 20B are views for describing the method for assembling the coaxial connector device 511, and are views showing steps following FIG. 19D.

Figures 19A, 19B, 19C, 19D:
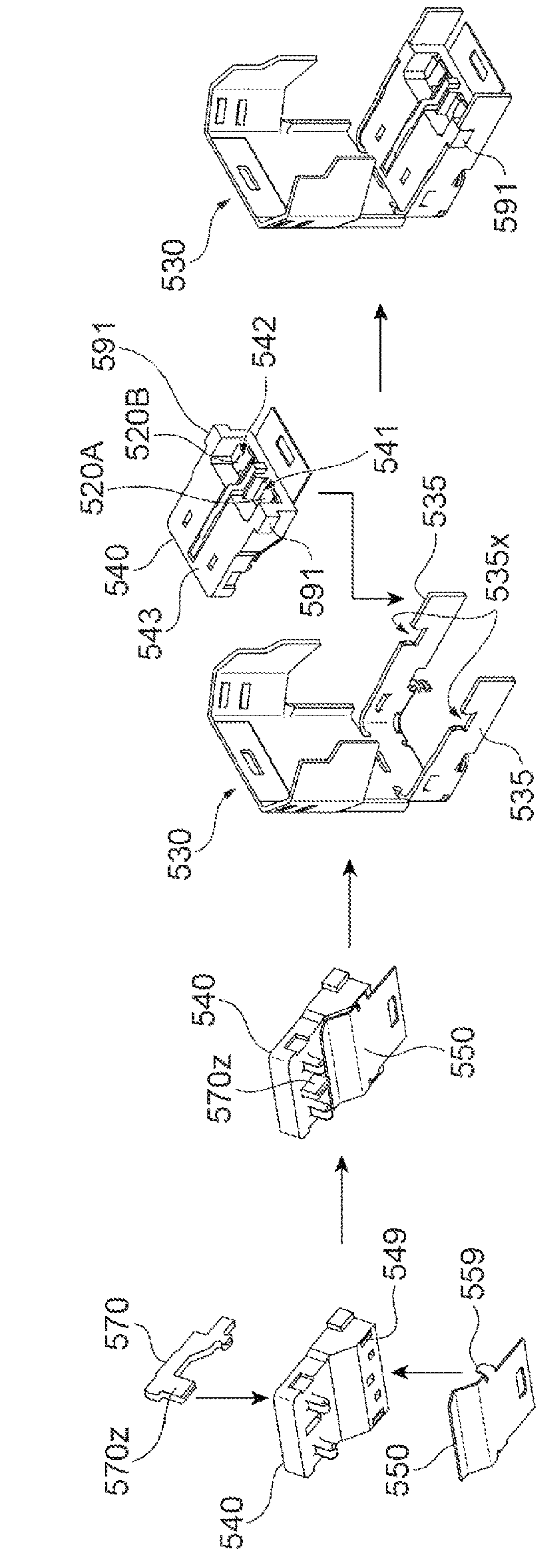
FIGS. 19A to 19D are views for describing a method for assembling the coaxial connector device of FIG. 13.
Figure 20B:
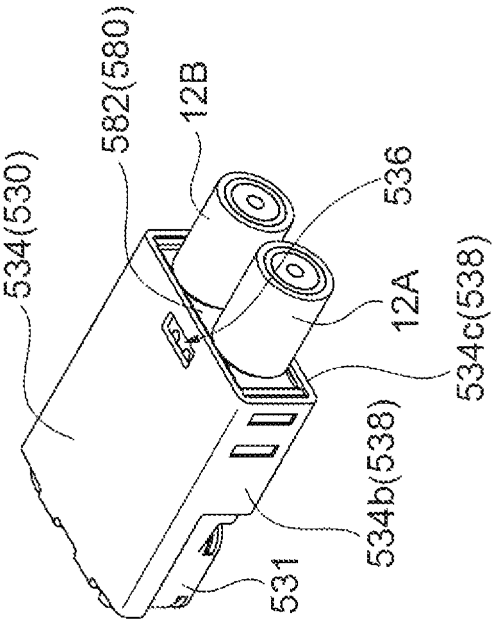
FIGS. 20A and 20B are views for describing the method for assembling the coaxial connector device of FIG. 13, and are views showing steps following FIG. 19D.

In an initial step, as shown in FIG. 19A, the insulating housing 540 with which the conductive member 550 and the signal contact members 520A and 520B are integrally molded, and the isolation characteristic improving portion 570 are prepared, and the connection portions 559 of the conductive member 550 are inserted into the insertion openings 549 of the insulating housing 540, and the isolation characteristic improving portion 570 is fixed to the recessed portion 546 (refer to FIG. 13) of the insulating housing 540, so that as shown in FIG. 19B, the conductive member 550 and the like are integrated with the insulating housing 540.

Subsequently, as shown in FIG. 19C, the insulating housing 540 with which the conductive member 550 and the like are integrated is assembled to the ground contact member 530. Specifically, the insulating housing 540 is assembled to the ground contact member 530 such that the protrusion portions 591 of the insulating housing 540 are fitted to the recessed portions 535*x* of the pair of arm portions 535 and 535 (refer to FIG. 19D).

Figure 20A:
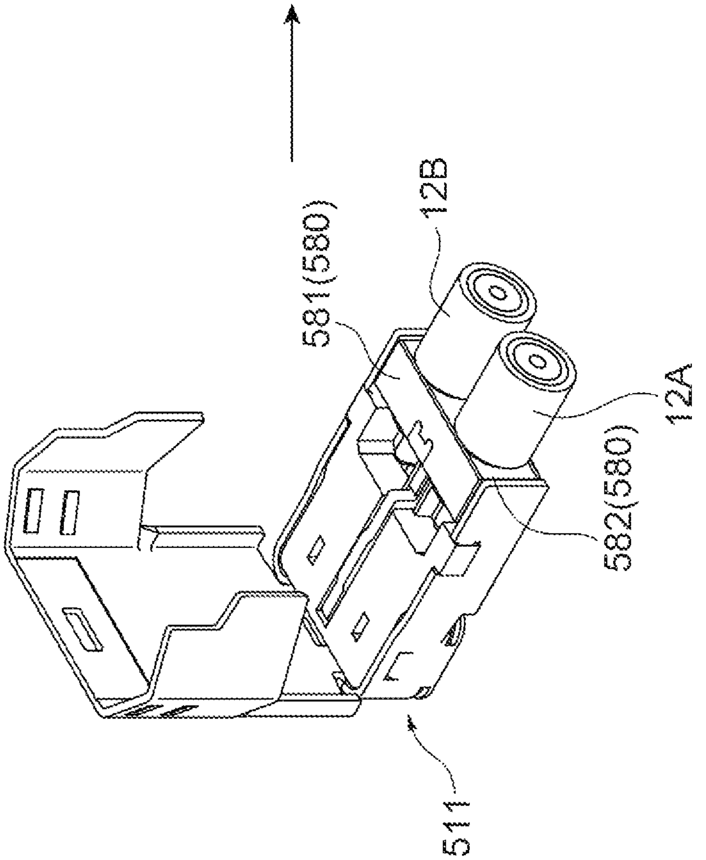

Subsequently, as shown in FIG. 20A, the coaxial connector device 511 is attached to the one end portions of the coaxial cables 12A and 12B. During attachment, the signal contact member 520A and the center conductor 13 of the coaxial cable 12A are connected to each other, and the signal contact member 520B and the center conductor 13 of the coaxial cable 12B are connected to each other. In addition, during attachment, the upper ground bar 581 and the isolation characteristic improving portion 570 are connected to each other. Thereafter, the shell portion 534 of the ground contact member 530 that has assumed the upright position comes to assume the bent position, and the clamping portion 534*b* and 534*c* are folded, so that as shown in FIG. 20B, a state where the coaxial connector device 511 is attached to the one end portions of the coaxial cables 12A and 12B is firmly maintained. After the clamping portion 534*b* and 534*c* are folded, the cutout 558, the pass-through portion 536, and the like are filled with solder.

Next, actions and effects of the coaxial connector device 511 will be described.

In a coaxial connector device 511, a shell portion 534 of a ground contact member 530 may include a first fixing portion 538 and a second fixing portion 539 as barrel portions that hold a coaxial cable 12A and a coaxial cable 12B, respectively, and a conductive member 550 may be connected to the first fixing portion 538 and to the second fixing portion 539. As described above, even when the first fixing portion 538 and the second fixing portion 539 cover and hold the cable fixing portion 580 instead of directly clamping the coaxial cable 12A and the coaxial cable 12B, portions at which signal lines and the conductive member 550 overlap each other can be suitably formed.

A front ground connection portion 557 of the conductive member 550 may be connected to an annular fitting portion 630, continuously formed in a width direction that is an arrangement direction of a signal contact member 520A and a signal contact member 520B, and overlap at least a part of two signal lines when viewed in a direction of fitting. In such a manner, since the front ground connection portion 557 is connected to a portion related to fitting (annular fitting portion 630) in the ground contact portion of the mating connector device 600, in a state where the front ground connection portion 557 is fitted to the mating connector device 600, a contact location can be reliably set to a ground potential. Furthermore, since the front ground connection portion 557 that is continuously formed without a cutout, a gap, or the like formed overlaps at least a part of the two signal lines, signals of the two signal lines can be more appropriately prevented from propagating to the outside.

An opening portion 595 may be formed in the annular fitting portion 630, and the front ground connection portion 557 may be formed in the opening portion 595. In such a manner, for example, since the front ground connection portion 557 that is conductive member is provided in the opening portion 595 that is formed in a process of manufacturing, the opening portion 595 is effectively closed by the front ground connection portion 557 in which a cutout, a gap, or the like is not formed, so that signals (high-frequency signals) of the signal lines can be effectively prevented from leaking from the opening portion 595 to the outside.

An isolation characteristic improving portion 570 may be disposed between the signal contact member 520A and the signal contact member 520B to block at least a part of a region between the signal contact member 520A and the signal contact member 520B. In such a manner, since the isolation characteristic improving portion 570 is disposed to block the region between the signal contact member 520A and the signal contact member 520B, signals can be more effectively prevented from propagating between the signal contact member 520A and the signal contact member 520B. Accordingly, the isolation characteristic can be further improved.

The isolation characteristic improving portion 570 may extend along an extending direction of the signal contact member 520A and of the signal contact member 520B. Accordingly, the region between the signal contact member 520A and the signal contact member 520B is effectively blocked by the isolation characteristic improving portion 570, so that the above-described isolation characteristic can be further improved.

The isolation characteristic improving portion 570 may be disposed between the signal contact member 520A and the signal contact member 520B to block an entirety of the region between the signal contact member 520A and the signal contact member 520B. In such a manner, since the region between the signal contact members is completely blocked by the isolation characteristic improving portion 570, the above-described isolation characteristic can be further improved.

An area of the isolation characteristic improving portion 570 when viewed in a width direction that is an arrangement direction of the signal contact member 520A and the signal contact member 520B may be larger than an area of each of the signal contact member 520A and the signal contact member 520B when viewed in the arrangement direction. In such a manner, since the area of the isolation characteristic improving portion 570 is set to be large, signals are more effectively prevented from propagating between the signal contact members by the isolation characteristic improving portion 570. Accordingly, the isolation characteristic can be further improved.

The isolation characteristic improving portion 570 may be formed of a member separate from other regions in the second ground connection portion. Accordingly, the degree of freedom in the shape, the raw material, and the disposition of the isolation characteristic improving portion 570 is increased, and signals are more effectively prevented from propagating between the signal contact members by the isolation characteristic improving portion 570 of which the shape, the raw material, and the disposition are appropriately set. Accordingly, the isolation characteristic can be further improved.

The isolation characteristic improving portion 570 may be connected to a ground bar 581 outer conductors 15 of the coaxial cables 12A and 12B. Accordingly, similarly to the center conductor 13 of the coaxial cable 12A and the center conductor 13 of the coaxial cable 12B adjacent to each other with the outer conductors 15 sandwiched therebetween, the signal contact member 520A and the signal contact member 520B are adjacent to each other with the isolation characteristic improving portion 570 sandwiched therebetween, the isolation characteristic improving portion 570 being electrically connected to the outer conductors 15 through the ground bar 581, so that similarly to the coaxial cables 12A and 12B adjacent to each other, signals can be effectively prevented from propagating between the signal contact member 520A and the signal contact member 520B.

The invention claimed is:

1. An electrical connector comprising:

a first signal contact member that is connected to a center conductor of a first coaxial cable, and that is connected to a first signal contact portion of a mating connector mounted on a circuit board;

a second signal contact member that is connected to a center conductor of a second coaxial cable, and that is connected to a second signal contact portion of the mating connector;

a ground contact member to which a ground potential is applied, the ground contact member comprising:

an annular fitting portion that is fitted and connected to a ground contact portion of the mating connector; and a shell portion that bendably extends from the annular fitting portion to be connected to outer conductors of the first coaxial cable and of the second coaxial cable; and a conductive member comprising:

a first ground connection portion that is connected to the ground contact member; and a second ground connection portion that is connected to the ground contact portion of the mating connector, wherein when viewed from a direction of fitting to the mating connector, the second ground connection portion of the conductive member overlaps at least a part of a first signal line, and the first signal line comprises the center conductor of the first coaxial cable and the first signal contact member, and wherein when viewed from the direction of fitting to the mating connector, the second ground connection portion of the conductive member overlaps at least a part of a second signal line, and the second signal line comprises the center conductor of the second coaxial cable and the second signal contact member.

2. The electrical connector according to claim 1, wherein the shell portion of the ground contact member comprises a barrel portion that clamps and holds the first coaxial cable and the second coaxial cable, and wherein the conductive member is connected to the barrel portion.

3. The electrical connector according to claim 1, wherein the shell portion of the ground contact member comprises a barrel portion that holds the first coaxial cable and the second coaxial cable, and wherein the conductive member is connected to the barrel portion.

4. The electrical connector according to claim 1, wherein the ground contact portion of the mating connector comprises a first portion that is fitted and connected to the annular fitting portion of the ground contact member, wherein the second ground connection portion comprises a pair of first connection portions that are connected to the first portion, wherein one of the pair of first connection portions overlaps at least a part of the first signal line when viewed from the direction of fitting, and wherein the other of the pair of first connection portions overlaps at least a part of the second signal line when viewed from the direction of fitting.

5. The electrical connector according to claim 4, wherein the shell portion of the ground contact member comprises a barrel portion that clamps and holds the first coaxial cable and the second coaxial cable, and when viewed from the direction of fitting, the pair of first connection portions overlap the barrel portion in an arrangement direction of the first signal contact member and the second signal contact member.

6. The electrical connector according to claim 4, wherein an opening portion is formed in the annular fitting portion of the ground contact member, and wherein the pair of first connection portions are disposed in the opening portion.

7. The electrical connector according to claim 1, wherein the ground contact portion of the mating connector comprises a first portion that is fitted and connected to the annular fitting portion of the ground contact member, wherein the second ground connection portion comprises a first connection portion that is connected to the first portion, and wherein the first connection portion is continuously formed in an arrangement direction of the first signal contact member and the second signal contact member, and wherein the first connection portion overlaps at least a part of the first signal line and at least a part of the second signal line when viewed from the direction of fitting.

8. The electrical connector according to claim 7, wherein an opening portion is formed in the annular fitting portion of the ground contact member, and wherein the first connection portion is disposed in the opening portion.

9. The electrical connector according to claim 1, wherein the ground contact portion of the mating connector comprises a second portion disposed between the first signal contact portion and the second signal contact portion, and wherein the second ground connection portion comprises a second connection portion that is connected to the second portion.

10. The electrical connector according to claim 9, wherein the second connection portion is disposed between the first signal contact member and the second signal contact member to block at least a part of a region located between the first signal contact member and the second signal contact member.

11. The electrical connector according to claim 10, wherein the second connection portion extends along an extending direction of the first signal contact member and of the second signal contact member.

12. The electrical connector according to claim 10, wherein the second connection portion is disposed between the first signal contact member and the second signal contact member to block an entirety of the region located between the first signal contact member and the second signal contact member.

13. The electrical connector according to claim 10, wherein an area of the second connection portion when viewed from an arrangement direction of the first signal contact member and the second signal contact member is larger than an area of each of the first signal contact member and the second signal contact member when viewed from the arrangement direction.

14. The electrical connector according to claim 10, wherein the second connection portion is formed of a member separate from other members in the second ground connection portion.

15. The electrical connector according to claim 14, wherein the second connection portion is connected to a ground bar electrically connected to the outer conductors of the first coaxial cable and of the second coaxial cable.

16. The electrical connector according to claim 1, wherein when viewed from the direction of fitting to the mating connector, the second ground connection portion of the conductive member overlaps at least a part of the center conductor of the first coaxial cable, and wherein when viewed from the direction of fitting to the mating connector, the second ground connection portion of the conductive member overlaps at least a part of the center conductor of the second coaxial cable.

17. An electrical connector comprising:

a first signal contact member that is connected to a center conductor of a first coaxial cable, and that is connected to a first signal contact portion of a mating connector mounted on a circuit board;

a second signal contact member that is connected to a center conductor of a second coaxial cable, and that is connected to a second signal contact portion of the mating connector;

a ground contact member to which a ground potential is applied, the ground contact member comprising:

an annular fitting portion that is fitted and connected to a ground contact portion of the mating connector; and a shell portion that bendably extends from the annular fitting portion to be connected to outer conductors of the first coaxial cable and of the second coaxial cable; and a conductive member comprising:

a first ground connection portion that is connected to the ground contact member; and a second ground connection portion that is connected to the ground contact portion of the mating connector, wherein when viewed from a direction of fitting to the mating connector, the second ground connection portion of the conductive member overlaps at least a part of a first signal line or at least a part of a second signal line, the first signal line comprising the center conductor of the first coaxial cable and the first signal contact member, the second signal line comprising the center conductor of the second coaxial cable and the second signal contact member.

* * * * *